(12) United States Patent
Cho et al.

(10) Patent No.: US 9,654,165 B2
(45) Date of Patent: May 16, 2017

(54) ACCESSORY DEVICE AND ELECTRONIC DEVICE INCLUDING THE SAME

(71) Applicant: Samsung Electronics Co., Ltd., Gyeonggi-do (KR)

(72) Inventors: Chul In Cho, Gyeonggi-do (KR); Kwang Sub Bong, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/098,724

(22) Filed: Apr. 14, 2016

(65) Prior Publication Data

US 2016/0323002 A1 Nov. 3, 2016

(30) Foreign Application Priority Data

Apr. 30, 2015 (KR) .................. 10-2015-0061430

(51) Int. Cl.
*H04M 1/00* (2006.01)
*H04B 1/3888* (2015.01)
*H04B 1/3877* (2015.01)

(52) U.S. Cl.
CPC ......... *H04B 1/3888* (2013.01); *H04B 1/3877* (2013.01)

(58) Field of Classification Search
CPC ....... H04B 1/0343; H04W 4/008; H04L 67/22
USPC ............. 455/575.1, 90.3, 550.1, 575.6, 100; 343/718; 206/320
See application file for complete search history.

(56) References Cited

U.S. PATENT DOCUMENTS

| 8,355,761 | B2* | 1/2013 | Harada | H01Q 1/243 455/575.1 |
| 8,474,609 | B1* | 7/2013 | Hong | A45C 11/00 206/320 |
| 8,665,044 | B2* | 3/2014 | Lauder | G06F 1/1626 206/320 |
| 8,724,300 | B2* | 5/2014 | Smith | G06F 1/1628 206/320 |
| 8,807,333 | B1* | 8/2014 | Cooper | A45C 11/00 206/320 |
| 8,878,637 | B2* | 11/2014 | Sartee | G06F 1/16 206/320 |
| 8,953,310 | B2* | 2/2015 | Smith | G06F 1/16 160/266 |
| 8,975,991 | B2* | 3/2015 | Lauder | H01F 7/04 206/320 |
| 9,000,871 | B2* | 4/2015 | Cencioni | G06F 1/1626 206/45.2 |
| 9,035,872 | B2* | 5/2015 | Brown | G06F 3/01 345/156 |
| 2014/0211393 | A1 | 7/2014 | Lee | |
| 2015/0263776 | A1* | 9/2015 | Shyu | A45C 13/002 455/575.8 |

FOREIGN PATENT DOCUMENTS

| KR | 20-0473278 | 6/2014 |
| KR | 20-0475554 | 12/2014 |

* cited by examiner

*Primary Examiner* — Sonny Trinh
(74) *Attorney, Agent, or Firm* — The Farrell Law Firm, P.C.

(57) ABSTRACT

An accessory device is provided that covers an electronic device. The accessory device includes a plurality of members which are connected to each other to be pivoted with respect to each other. The plurality of members may be pivoted to maintain a viewing angle of the electronic device on a surface.

19 Claims, 28 Drawing Sheets

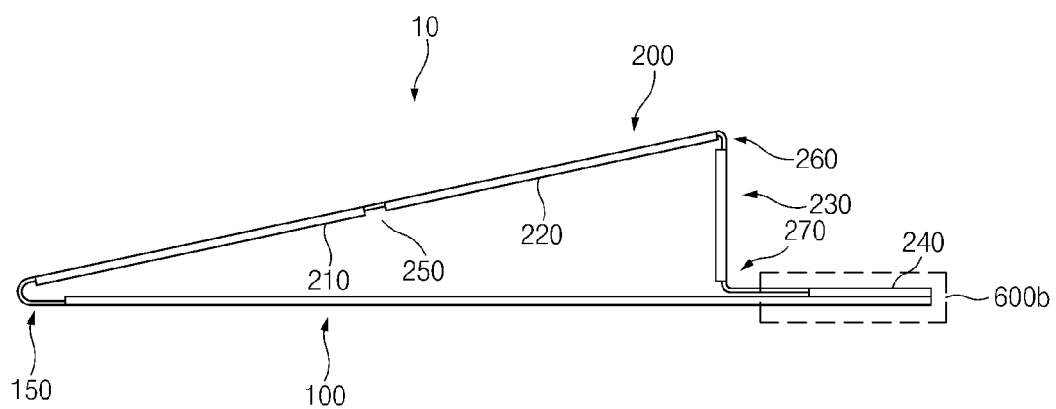
F I G. 6B

ACCESSORY DEVICE AND ELECTRONIC DEVICE INCLUDING THE SAME

PRIORITY

This application claims priority under 35 U.S.C. §119(a) to Korean Patent Application Serial No. 10-2015-0061430, which was filed in the Korean Intellectual Property Office on Apr. 30, 2015, the entire disclosure of which is incorporated herein by reference.

BACKGROUND

1. Field of the Disclosure

The present disclosure relates to generally to an accessory device, and more particularly an electronic device cover and electronic device including a cover that can support the electronic device in various positions.

2. Description of the Related Art

While electronic devices are generally manufactured in a panel form having a substantially rectangular shape and having a predetermined thickness in consideration of mobility and portability, it is often difficult to use these type of manufactured electronic devices when not being hand held, e.g., when placed on a relatively flat surface, such as a table, a desk, etc.

SUMMARY

The present disclosure is made to address at least the above-mentioned problems and/or disadvantages and to provide at least the advantages described below.

Accordingly, an aspect of the present disclosure is to provide an electronic device accessory device and electronic device including the accessory device that positions the electronic device at various angles when placed on a flat surface.

In accordance with an aspect of the present disclosure, an accessory device is provided, which is detachably connectable to an electronic device including a first display surface and a second surface facing an opposite side of the first surface. The accessory device includes a first member that is foldable to cover at least a portion of a front surface of the electronic device or to towards a rear surface of the electronic device; a second member that is flexibly connected to the first member and detachably connected to the rear surface of the electronic device; a third member that is flexibly connected to the second member and capable of being disposed to cover the rear surface of the electronic device or supporting the rear surface of the electronic device corresponding to a folding state thereof; a fourth member that is flexibly connected to the third member and foldable to cover the rear surface of the electronic device or to support the third is member; and a fifth member that is flexibly connected to the fourth member and foldable to contact the first member at a first position or to contact the first member at a second position and support the fourth member by maintaining contact with the first member at the second position. The fifth member maintains contact with the first member using magnetic force.

In accordance with another aspect of the present disclosure, an accessory device is provided, which is detachably connectable to an electronic device including a first display surface and a second surface facing an opposite side of the first surface. The accessory device includes a first member that is foldable to cover at least a portion of the display surface of the electronic device, the first member including a first plate; a second member that is flexibly connected to the first member, the second member including a second plate that is smaller than the first plate; a third member that is flexibly connected to the second member on an opposite side of the first member, the third member including a third plate that is smaller than the first plate; a fourth member that is flexibly connected to the third member on an opposite side of the second member, the fourth member including a fourth plate that is smaller than the first plate; and a fifth member that is flexibly connected to the fourth member on an opposite side of the third member, the fifth member including a fifth plate that is smaller than the first plate. At least one of the first member, the fourth member, and the fifth member comprises a magnetic body or a material attracted by a magnet, and at least one of the second member and the third member comprises a material that interrupts a magnetic field generated by the magnetic body.

In accordance with another aspect of the present disclosure, an electronic device is provided, which includes a housing; a touch screen display disposed at a first surface of the housing; a first member that is foldable to cover at least a portion of the first surface of the housing, the first member including a first plate; a second member that is flexibly connected to the first member and fixed to a second surface of the housing, the second surface of the housing being opposite the first surface of the housing and the second is member including a second plate that is smaller than the first plate; a third member that is flexibly connected to the second member on an opposite side of the first member, the third member including a third plate that is smaller than the first plate; a fourth member that is flexibly connected to the third member on an opposite side of the second member, the fourth member including a fourth plate that is smaller than the first plate; and a fifth member that is flexibly connected to the fourth member on an opposite side of the third member, the fifth member including a fifth plate that is smaller than the first plate. At least one of the first member, the fourth member, and the fifth member includes a magnetic body or a material that is attracted by a magnet.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6B illustrates a cover in the second folding state according to an embodiment of the present disclosure;

Throughout the drawings, it should be noted that like reference numbers are used to depict the same or similar elements, features, and structures.

DETAILED DESCRIPTION OF EMBODIMENTS OF THE DISCLOSURE

Figure 1:
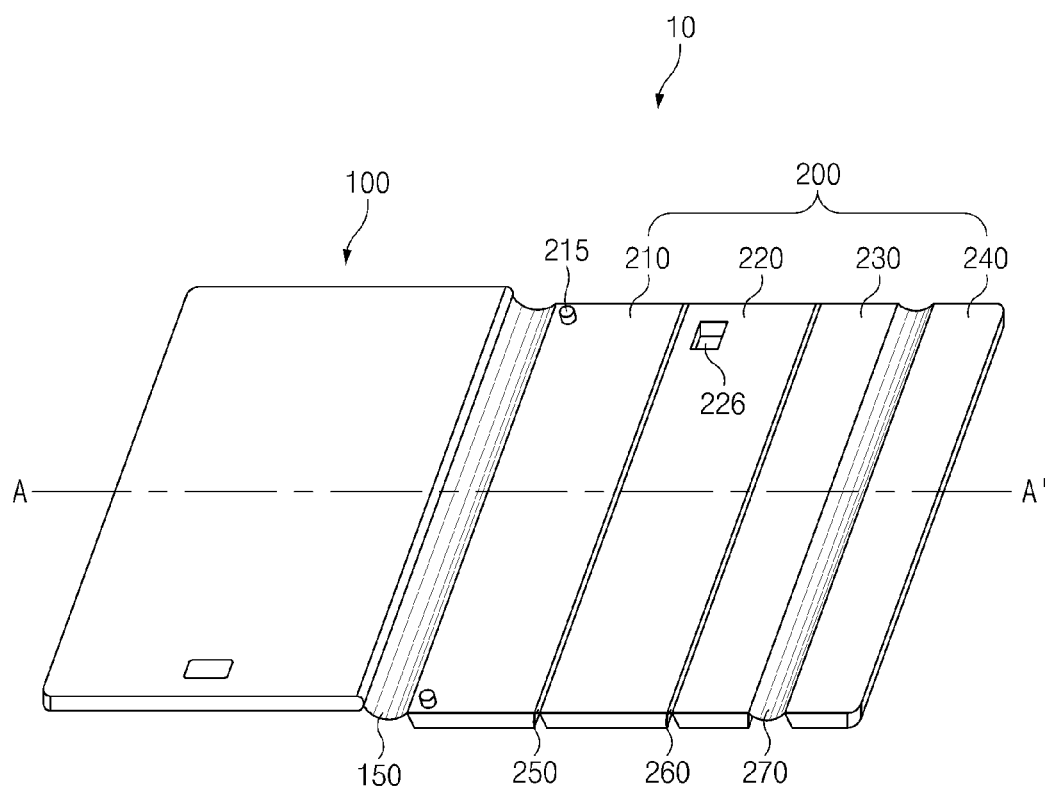
FIG. 1 illustrates an accessory device according to an embodiment of the present disclosure.

Hereinafter, various embodiments of the present disclosure will be described with reference to the accompanying drawings. Accordingly, those of ordinary skill in the art will recognize that there is no intent to limit the present disclosure to the particular embodiments described herein; rather, it is intended that the present disclosure should be construed to cover various modifications, equivalents, and/or alternatives of embodiments of the present disclosure.

With regard to description of drawings, similar components may be marked by similar reference numerals.

Herein, the terms used to describe specified embodiments of the present disclosure are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. Terms that are defined in a dictionary and commonly used, should also be interpreted as is customary in the relevant related art and not in an idealized or overly formal manner unless expressly so defined as such herein. In some cases, even if terms are defined in the specification, they may not be interpreted to exclude embodiments of the present disclosure.

Herein, the expressions "have", "may have", "include", "comprise", "may include", and "may comprise" indicate the existence of corresponding features (e.g., elements such as numeric values, functions, operations, or components), but do not exclude the existence of additional features.

The expressions "A or B", "at least one of A or/and B", "one or more of A or/and B", etc., may include any and all combinations of one or more of the associated listed items. For example, the expressions "A or B", "at least one of A and B", and "at least one of A or B" may refer to (1) where at least one A is included, (2) where at least one B is included, or (3) where both of at least one A and at least one B are included.

The terms, such as "first", "second", etc., may refer to various elements of various embodiments of the present disclosure, but do not limit the elements. For example, such terms do not limit the order and/or priority of the elements. Accordingly, a first user device and a second user device may represent different user devices irrespective of sequence or importance. For example, a first element may be referred to as a second element, and similarly, a second element may be referred to as a first element.

When an element (e.g., a first element) is referred to as being "(operatively or communicatively) coupled with/to" or "connected to" another element (e.g., a second element), the first element can be directly coupled with/to or connected to the second element or an intervening element (e.g., a third element) may be present therebetween. However, when the first element is referred to as being "directly coupled with/to" or "directly connected to" the second element, no intervening elements may be present therebetween.

According to context, the expression "configured to" may mean "suitable for", "having the capacity to", "designed to", "adapted to", "made to", or "capable of". The term "configured to" does not necessarily mean "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor), which may perform corresponding operations by executing one or more software programs that are stored in a memory device.

An electronic device according to an embodiment of the present disclosure may include a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), an MP3 player, a mobile medical device, a camera, or a wearable device (e.g., a head-mounted-device (HMD) such as electronic glasses, electronic apparel, an electronic bracelet, an electronic necklace, an electronic appcessory, an electronic tattoo, a smart mirror, a smart watch, etc.

Herein, the term "user" may refer to a person who uses an electronic device or may refer to a device (e.g., an artificial intelligence (AI) electronic device) that uses an electronic device.

FIG. 1 illustrates an accessory device according to an embodiment of the present disclosure.

Referring to FIG. 1, the accessory device, i.e., a cover 10 includes an upper cover 100, a lower cover 200, and a cover connector 150.

The upper cover 100 may have a predetermined size and a predetermined shape to cover a surface of a particular electronic device. For example, the upper cover 100 may have a first area and a first shape corresponding to a front area of an electronic device 5 of FIG. 4.

The upper cover 100 is connected to the lower cover 200 through the cover connector 150, and may be pivoted in a predetermined direction using the cover connector 150 as a pivot axis thereof. For example, the upper cover 100 may be folder to cover at least a portion of the lower cover 200. The front and rear surfaces of the upper cover 100 may be uniform and flat surfaces.

A plate may be included in the upper cover 100, which is made of a material having a predetermined strength, for example, a metal, a plastic material, or a synthetic rubber.

The area of the upper cover 100 may be equal to or larger than the front area of the electronic device, which can attached to the lower cover 200.

Further, the upper cover 100 may have a size large enough to cover the front area of the electronic device and make contact with an end of a stopper 240 included in the lower cover 200.

The lower cover 200 includes a device connector 210, a support 220, a support connector 230, and the stopper 240. The lower cover 200 includes a first joint 250 that connects the device connector 210 and the support 220, a second joint 260 that connects the support 220 and the support connector 230, and a stopper connector 270 that connects the support connector 230 and the stopper 240.

Alternatively, the stopper 240 and the stopper connector 270 may be omitted from the lower cover 200. When the stopper 240 and the stopper connector 270 are excluded, the upper cover 100 and the lower cover 200 may cover the front surface, the rear surface, and a side surface of the electronic device.

Additionally, the support 220, the support connector 230, and the stopper 240 of the lower cover 200 may include more joints. For example, although the support 220 has one integral shape in FIG. 1, the support 220 may have a state in which a plurality of sub-supports are connected to each other by one or more joints. Similarly, the support connector 230 may be configured such that a plurality of sub-support connectors are disposed in parallel and are connected to each other by joints.

The stopper 240 may be also disposed such that a plurality of sub-stoppers are disposed in parallel and are connected to each other by joints.

According to an embodiment of the present disclosure, the support 220 and the support connector 230 may be provided as one substrate. For example, the second joint 260 may be removed, and the support 220 and the support connector 230 may be provided as a single substrate.

The device connector 210 is connected to the upper cover 100 through the cover connector 150. An opposite side of the device connector 210 is connected to the support 220 through the first joint 250. The device connector 210 may be formed to have, for example, a second size and a second shape which are different from those of the upper cover 100. The device connector 210 may be an area to which the rear surface of the electronic device is connected. The device connector 210 includes a plurality of coupling bosses 215 which couple to the rear surface of the electronic device.

The support 220 is connected to the device connector 210 through the first joint 250. An opposite side of the support 220 is connected to the support connector 230 through the second joint 260. The support 220 may be formed to have, for example, a third size and a third shape (for example, a rectangular shape which extend widthwise) which are different from those of the upper cover 100. The support 220 may have an area which is similar to or the same as that of the device connector 210. The support 220 contacts the rear surface of the electronic device or supports one side of the rear surface of the electronic device according to a folding state of the cover 10, while the electronic device is connected thereto.

A camera hole 226 is disposed on the support 220 to expose the camera included in the electronic device to the outside. The location and size of the camera hole 226 may be changed according to the location of the camera in the electronic device. For example, the camera hole 226 may be disposed in the device connector 210 or the support connector 230 according to the location of the camera disposed in the electronic device.

The support connector 230 is connected to the connector 220 through the second joint 260, and an opposite side of the support connector 230 is connected to the stopper 240 through the stopper connector 270. The support connector 230 may have a size and a shape which are different from those of the support 220 (for example, a rectangular shape which has a width smaller than that of the support 220 and one side of which is longer than an opposite side thereof). The support connector 230 may contact the rear surface of the electronic device or support one side of the support connector 230 according to a folding state of the cover 10 while the electronic device is connected thereto.

One side of the stopper 240 is connected to the support connector 230 through the stopper connector 270, and an opposite side of the stopper 240 is finished, as it is not connected to a separate structure. The stopper 240 may have a size and a shape (for example, a rectangular shape one side of which is longer than an opposite side thereof) which are similar to, the same as, or different from those of the support connector 230. The stopper 240 may have a size and a shape which are similar to or the same as those of the support connector 230. The stopper 240 may overlap a periphery of one side surface of the upper cover 100 according to a folding state, or may be disposed to overlap a periphery of an opposite side surface of the upper cover 100. Further, the stopper 240 may be disposed in parallel to the support connector 230 according to a spreading state.

The first joint 250 may support a pivotal movement of the support 220 The first joint 250 may support a pivotal movement of the support 220 in one direction (for example, towards the rear surface of the electronic device) while the electronic device is coupled to the device connector 210. The first joint 250 may be formed of a material having a predetermined tension (e.g., synthetic rubber, synthetic or natural leather, a synthetic resin, synthetic or natural fabric, etc.). The first joint 250 may have a first thickness and a first width, which stops the support 220 from being folded by a specific angle or more. The first thickness and the first width of the first joint 250 may be changed according to the thickness of the device connector 210 and the thickness of the support 220.

The second joint 260 may support a folding movement of the support connector 230 and the support 220. The second joint 260 may be provided such that an included angle between the support 220 and the support connector 230 is formed within a designated angle range. The second joint 260 may be formed of a material which is the same as or similar to that of the first joint 250. The second joint 260 may have a second thickness and a second width such that the support connector may be is pivoted upwards and downwards by a specific angle or more with respect to the support 220. The second thickness and the second width may be changed according to the thicknesses of the support 220 and the support connector 230. The second joint 260 may be provided to have a shape which is similar to or the same as that of the first joint 250.

The stopper connector 270 may connect the support connector 230 and the stopper 240, and may support a pivotal movement of the stopper 240. The stopper connector 270 may have a third thickness and a third width, which may vary according to the thickness of the electronic device disposed on the lower cover 200. Further, the third width of the stopper connector 270 may be changed according to the locations of magnetic bodies (for example, at least one of a temporary magnetic body or a permanent magnetic body) disposed on the upper cover 100. The material of the stopper connector 270 may be similar to or the same as that of the first joint 250 or the second joint 260.

The cover connector 150 may support a pivotal movement of the upper cover 100 and/or the lower cover 200. The cover connector 150 may be provided to form an angle corresponding to a folding state in which one surface of the upper cover 100 is disposed to face one surface of the lower cover 200 and an angle (anywhere from 0 to 360 degrees) corresponding to a folding state in which an opposite surface of the upper cover 100 is disposed to face an opposite surface of the lower cover 200. The thickness and width of the cover connector 150 may be similar to those of the stopper connector 270.

Figure 2:
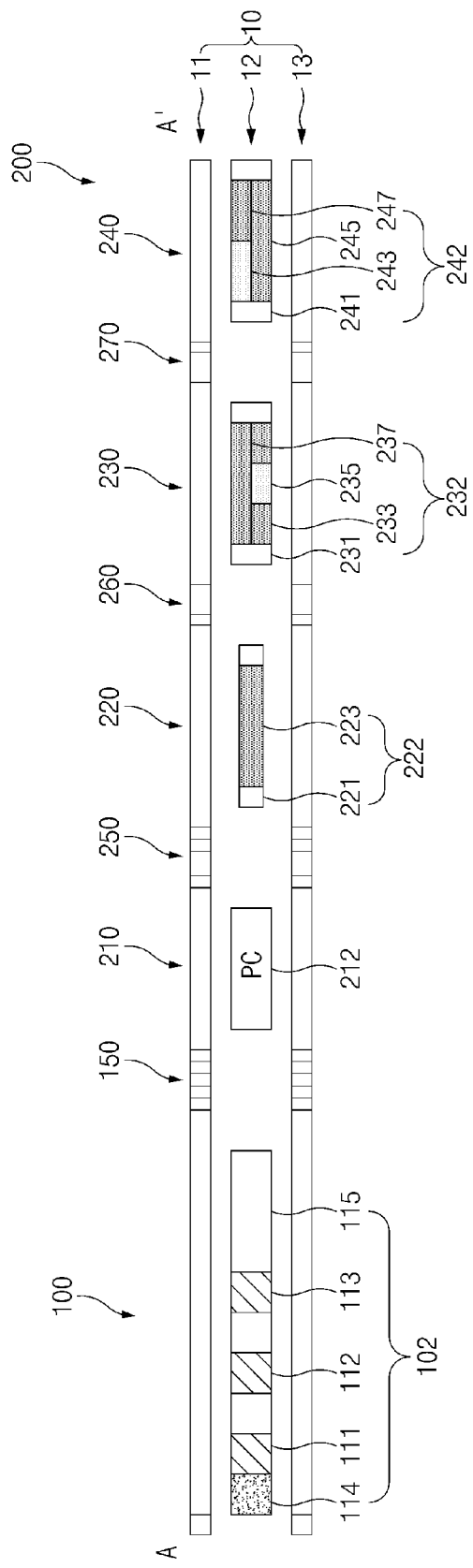
FIG. 2 illustrates a section of the accessory device taken along line A-A' of FIG. 1 according to an embodiment of the present disclosure.

FIG. 2 illustrates a section of the cover taken along line A-A' of FIG. 1 according to an embodiment of the present disclosure.

Referring to FIG. 2, the cover 10 includes a first outer surface 11, a second outer surface 13, and substrates 12 positioned between the first outer surface 11 and the second outer surface 13.

The first outer surface 11 may face an electronic device. For example, at least a portion of the first outer surface 11 on the lower cover 200 may face the rear surface of the electronic device when the cover 10 is coupled to the electronic device. The lower cover 200 may be configured such that the first outer surface 11 of the device connector 210, the support 220, and the support connector 230 may face the rear surface of the electronic device and the first outer surface 11 of the stopper 240 may face one end of the second outer surface 13 (for example, a periphery of the front surface or the rear surface of the second upper surface 13). The first outer surface 11 covering an upper substrate 102 may face the front surface of the electronic device (for example, the display surface of the electronic device) when the cover 10 is coupled to the electronic device.

The first outer surface 11 may be formed of a material that supports a predetermined tension. For example, at least a portion of the first outer surface 11 may be formed of synthetic rubber, synthetic or natural leather, a synthetic resin, synthetic or natural fabric, etc. The entire first outer surface 11 may be formed of one material (for example, a leather material).

The second outer surface 13 may overlap the first outer surface 11 on the rear surface of the first outer surface 11. The second outer surface 13, with the first outer surface 11, surround the substrates 12. Further, the second outer surface 13 may directly face the first outer surface 11 in an area in which the substrates 12 are not disposed.

At least a portion of the second outer surface 13 of the lower cover 200 may be disposed on the rear surface of the area to which the electronic device is disposed. The lower cover 200 is configured such that the second outer surface 13 of the device connector 210, the support 220, and the support connector 230 is disposed on the rear surface of the first outer surface 11 on which the electronic device is disposed and a stopper area of the second outer surface 13 is disposed to face a support connector area of the second outer surface 13 according to a folding state of the second outer surface 13. The second outer surface 13 disposed below the upper substrate 102 may be exposed to the outside while the first outer surface 11 faces the front surface of the electronic device.

The second outer surface 13 may be formed of a material supporting a predetermined tension, similarly to the first outer surface 11. For example, at least a portion of the second outer surface 13 may be formed of synthetic rubber, synthetic or natural leather, a synthetic resin, synthetic or natural fabric, etc., similarly to the first outer surface 11. The entire second outer surface 13 may be formed of a material (for example, a fabric material), which is different from that of the first outer surface 11.

The substrates 12 include, for example, an upper substrate 102 disposed in the upper cover 100, a device connecting substrate 212 disposed in the device connector 210, a support substrate 222 disposed in the support 220, a support connecting substrate 232 disposed in the support connector 230, and a stopper substrate 242 disposed in the stopper 240. For example, the upper substrate 102 may be formed of plastic or a synthetic resin (e.g., epoxy) at least a portion of which has a strength of a predetermined value or higher.

The upper substrate 102 includes an upper substrate 115, an upper magnetic substrate 114 (e.g., a temporary magnetic body), and first, second, and third upper magnetic bodies 111, 112, and 113 (e.g., permanent magnetic bodies). The upper substrate 115 may also have at least one hole.

A magnetic body may be disposed in the at least one hole formed in the upper substrate 115. For example, the upper magnetic substrate 114, the first upper magnetic body 111, the second upper magnetic body 112, and the third upper magnetic body 113 may be disposed in a row of holes formed on the upper substrate 115.

The upper substrate 102 may have a plurality of layers. For example, the upper substrate 102 may include a substrate formed of a synthetic resin, and film layers disposed to cover the front surface or the rear surface of the substrate.

The row of the plurality of holes, which have been described above, may be disposed in the substrate, and magnetic bodies may be disposed in the row of holes. The film layers on the front and rear surfaces of the substrate, on which the magnetic bodies are disposed, can prevent separation of the magnetic bodies.

The device connecting substrate 212 may be formed of a polycarbonate material. A coupling boss may be disposed on one side of the device connecting substrate 212. For example, coupling bosses may be disposed one side of an upper portion or one side of a lower portion of the device connecting substrate 212, respectively.

The support substrate 222 includes a support substrate body 221 formed of a synthetic resin or the like, and a support magnetic body substrate 223 (e.g., a temporary magnetic body). A hole in which the support magnetic body substrate 223 is disposed may be formed in a predetermined area of the support substrate body 221. The support magnetic body substrate 223 may be disposed in the hole, and film layers may be disposed on the front and rear surfaces of the support substrate 222. The support magnetic body substrate 223 may be formed of a magnetic substance such as steel, aluminum, or copper. The support magnetic body substrate 223 may be formed of a shielding sheet, e.g., a film on which a metal pattern having a designated thickness is mounted (i.e., a film on which metal lines are applied in the form of a mesh).

At least a portion of the support connecting substrate 232 may be formed of one or more magnetic bodies. For example, the support connecting substrate 232 includes a first support connecting substrate 231, a second support connecting substrate 237 (e.g., a temporary magnetic body), a third support connecting substrate 233 (e.g., a temporary magnetic body), and a support connecting magnetic body 235 (e.g., a permanent magnetic body). The first support connecting substrate 231 may be formed of a material, such as a synthetic resin, which is the same as or similar to that of the support substrate body 221.

The second support connecting substrate 237 may be a steel plate, an aluminum plate, a copper plate, or a film in which metal lines of a designated thickness or less are formed in a designated form (e.g., a form having a magnetic field shielding effect, a mesh form, etc.).

The third support connecting substrate 233 may overlap the second support connecting substrate 237. The third support connecting substrate 233 may be formed of a material which is the same as or similar to that of the second support connecting substrate 237. One surface of the second support connecting substrate 237 may face the first outer surface 11, and one surface of the third support connecting substrate 233 may face the second outer surface 13. The third support connecting substrate 233 may include a hole of a designated size in which the support connecting magnetic body 235 is disposed. The support connecting magnetic body 235 may be disposed in the one or more holes disposed in the third support connecting substrate 233. The support connecting magnetic body 235 may be, for example, a permanent magnet.

Film layers may be disposed on the second support connecting substrate 237 and under the third support connecting substrate 233 in order to fix the positions of the substrates and the magnetic bodies.

The stopper substrate 242 includes a first stopper substrate 241, a stopper magnetic body 243 (e.g., a permanent magnetic body), a second stopper substrate 247 (e.g., a temporary magnetic body), and a third stopper substrate 245 (e.g., a temporary magnetic body). The first stopper substrate 241 may be formed of a material which is similar to or the same as that of the first support connecting substrate 231.

The second stopper substrate 247 or the third stopper substrate 245 may be formed of a magnetic body (e.g., a temporary magnetic body or a permanent magnetic body). The second stopper substrate 247 and the third stopper substrate 245 may be formed of a steel plate, an aluminum plate, a copper plate, or a shielding sheet.

One surface of the second stopper substrate 247 may face the first outer surface 11, and one surface of the third stopper substrate 245 may face the outer surface outside 13. For example, the third stopper substrate 245 may be disposed under an area in which the second stopper substrate 247 or the stopper magnetic body 243 is disposed. The stopper magnetic body 243 may be formed of a temporary magnetic body or a permanent magnetic body.

An area in which the substrates 12 are not disposed, but the areas of the first outer surface 11 and the second outer surface 13 are disposed may include the cover connector 150, the first joint 250, the second joint 260, and the stopper connector 270.

While FIG. 2 illustrates the device connector 210, the support 220, the support connector 230, and the stopper 240 including the support substrate body 221, the first support connecting substrate 231, and the first stopper substrate 241, respectively, the present disclosure is not limited thereto. For example, the device connector 210, the support 220, the support connector 230, and the stopper 240 may be provided such that at least one of the support substrate body 221, the first support connecting substrate 231, the first stopper substrate 241, etc., are excluded. For example, the substrates may be formed only of a substrate formed of a designated magnetic body such as a steel plate or an aluminum plate. A temporary magnetic body included in at least one of the device connector 210, the support 220, the support connector 230, and the stopper 240, which have been described above, may be replaced by a permanent magnet. For example, the temporary magnetic body may be a ferromagnetic material, an antiferromagnetic material, or a ferrimagnetic material.

Figure 3:
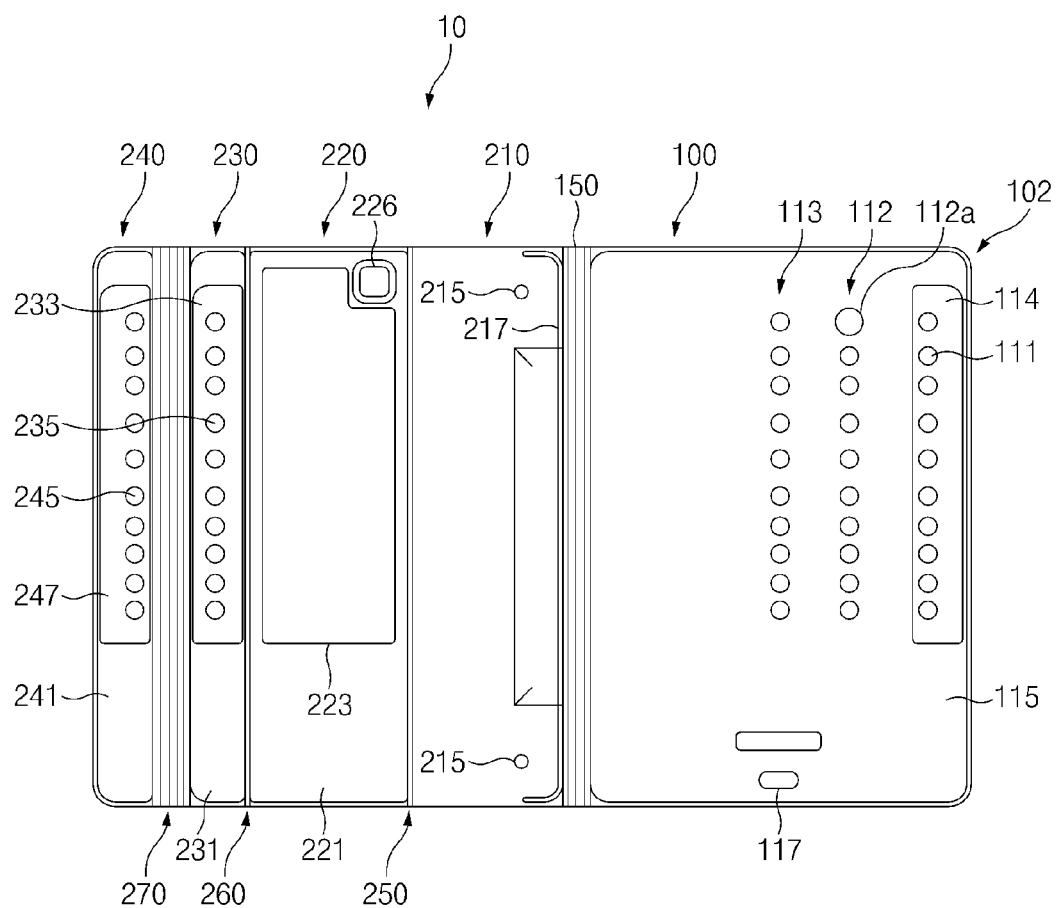
FIG. 3 illustrates a cover from which an upper outer surface or a lower outer surface is removed according to an embodiment of the present disclosure.

FIG. 3 illustrates a cover from which an upper outer surface or a lower outer surface is removed according to an embodiment of the present disclosure. Specifically, FIG. 3 illustrates the different substrates disposed between the upper outer surface and the lower outer surface of the cover.

Referring to FIG. 3, the cover 10 includes the upper cover 100, the lower cover 200, and the cover connector 150.

The upper cover 100 includes the upper substrate 102. The upper substrate 102 includes an upper substrate body 115, an upper magnetic substrate 114 disposed in the upper substrate body 115 at a predetermined interval, a first upper magnetic body 111, a second upper magnetic body 112, and a third upper magnetic body 113. The upper cover 100 may cover or protect the display surface or the rear surface of the electronic device.

At least a portion of the upper substrate 102 may be formed of various materials in relation to strength and external appearance. For example, the upper substrate body 115 of the upper substrate 102 may be formed of plastic, leather, artificial leather, glass, ceramic, steel, stainless steel, and/or a metal alloy such as a titanium or magnesium alloy. The upper substrate body 115 may be formed of a synthetic resin in consideration of its weight.

Recesses or holes in which the upper magnetic substrate 114, the first upper magnetic body 111, the second upper magnetic body 112, and the third upper magnetic body 113 are disposed may be provided in the upper substrate body 115. At least one upper substrate recess 117 may be disposed on one side of the upper substrate 115, e.g., at a location corresponding to a home button of the electronic device when the upper cover 100 covers the display surface of the electronic device.

The upper magnetic substrate 114 may be disposed on one side of a periphery of the upper substrate 102. The upper magnetic substrate 114 may be formed of a metal material (e.g., steel, aluminum, or copper). The upper magnetic substrate 114 may be formed of a film in which metallic lines are applied while forming a designated pattern. At least one hole may be disposed on one side of the upper magnetic substrate 114 such that the first upper magnetic body 111 may be disposed therein.

The upper magnetic substrate 114 may be disposed in parallel to a periphery of the upper substrate 102. An area of the cover 10 corresponding to the upper magnetic substrate 114 may contact with at least one of the stopper 240 and the support connector 230 by a magnetic force according to a folding state of the cover 10.

The first upper magnetic body 111 may be configured such that one or more magnetic bodies (for example, coin type permanent magnets) are disposed in holes formed in the upper magnetic substrate 114 at a predetermined interval. The first upper magnetic body 111 may be disposed on the upper magnetic substrate 114 to be inclined toward the inside (e.g., towards the cover connector 150).

The second upper magnetic body 112 may be disposed between the first upper magnetic body 111 and the third upper magnetic body 113. The second upper magnetic body 112 may be formed of a plurality of coil type magnetic bodies (e.g., permanent magnets) disposed longitudinally in parallel with respect to the illustrated drawing. An arbitrary magnetic body, for example, a magnetic body 112a arranged at the end of the second upper magnetic body 112 may provide a magnetic force for a Hall IC provided in the electronic device. The magnetic body 112a may have a magnetic force that is greater than those of adjacent magnetic bodies. For example, when the adjacent magnetic bodies have a predetermined magnetic force base on volume, the magnetic body 112a may have a relatively large size as compared with the other magnetic bodies.

An area of the upper cover 100 in which the second upper magnetic body 112 is disposed may contact at least one of the stopper 240, the support 220, and the support connector 230, based on the folding of the cover 10 and the magnetic force.

The third upper magnetic body 113 may be disposed in parallel to the second upper magnetic body 112. The third upper magnetic body 113 may include a plurality of coin type magnetic bodies (e.g., permanent magnets) disposed at predetermined or arbitrary intervals.

An area of the upper cover 100 in which the third upper magnetic body 113 is disposed may contact at least one of the stopper 240, the support 220, and the support connector 230 according to a folding state of the cover 10 and the magnetic force.

Although FIG. 3 illustrates the first upper magnetic body 111, the second upper magnetic body 112, and the third upper magnetic body 113 as coin type magnets, the present disclosure is not limited thereto. For example, the first upper magnetic body 111, the second upper magnetic body 112, and the third upper magnetic body 113 may include a connected bar magnet shape.

The upper magnetic substrate 114, the first upper magnetic body 111, the second upper magnetic body 112, and the third upper magnetic body 113 may be disposed closer to an intermediate end and an upper end of the upper cover 100 in consideration of an antenna disposition position of the electronic device.

The lower cover 200 includes the device connector 210, the support 220, the support connector 230, and the stopper 240. The lower cover 200 includes the first joint 250 that pivots the support 220 about the device connector 210, the second joint 260 that supports pivotal movement of the support 220 and the support connector 230, and the stopper connector 270 that supports pivotal movement of the second joint 260, the support connector 230, and the stopper 240.

The device connector 210 may include a coupling boss 215 as illustrated in FIG. 1. The location of the coupling boss 215 may correspond to a hook hole provided in the electronic device. The device connector 210 attached to the electronic device, and may be formed of a material having a predetermined strength. For example, the device connector 210 may be formed of a material having a relatively high strength as compared with that of the upper substrate 102 or the support substrate body 221.

A guide wall 217 may be provided on one side of the device connector 210 for arrangement of the electronic device. The guide wall 217 surrounds a periphery (the right periphery, a portion of the upper periphery, and a portion of the lower periphery) of the device connector 210. The guide wall 217 may be disposed in consideration of a distance from the coupling boss 215. When the electronic device has a coupling recess such that a resilient member covers an opening, the coupling recess may be coupled to the coupling boss 215. While the coupling boss 215 is coupled to the coupling recess, a peripheral area of the electronic device may be arranged on the guide wall 217. The user may couple the coupling recess of the electronic device to the coupling boss 215 while referring to the guide wall 217.

The support 220 includes the support substrate body 221, the support magnetic body substrate 223, and the camera hole 226. The support magnetic body substrate 223 may be disposed to be inclined towards an intermediate end and an upper end of the support substrate body 221 in consideration of the antenna disposition position of the electronic device. The support magnetic body substrate 223 may be formed, for example, of a steel plate or a shielding sheet.

The support connector 230 includes the first support connecting substrate 231, the second support connecting substrate 237, the third support connecting substrate 233, and the support connecting magnetic body 235. As described above, the second support connecting substrate 237 may be disposed on the third support connecting substrate 233 and the support connecting magnetic body 235. The second support connecting substrate 237, the support connecting magnetic body 235, the third support connecting substrate 233, etc., may be disposed to be inclined towards an intermediate end and an upper end of the first support connecting substrate 231 in consideration of the antenna disposition position of the electronic device.

The stopper 240 includes the first stopper substrate 241, the stopper magnetic is body 243, and the second stopper substrate 247. Additionally, the third stopper substrate 245 may be disposed under the second stopper substrate 247 and the stopper magnetic body 243. The stopper magnetic body 243, the second stopper substrate 247, the third stopper substrate 245, etc., may be disposed to be inclined towards an intermediate end and an upper end of the first stopper substrate 241 in consideration of the antenna disposition position (for example, in the form in which the antenna is disposed at a lower end of the electronic device) of the electronic device.

The antenna may situated in a predetermined area of an upper end and a lower end of the electronic device, and the substrate 247 and the magnetic body 243 may be disposed at an intermediate end of the first stopper substrate 241.

At least one of the upper magnetic substrate 114, the support magnetic body substrate 223, the first support substrate body 221, the second support connecting substrate 237, the third support connecting substrate 233, the second stopper substrate 247, and the third stopper substrate 245 may shield magnetic fields generated by the magnetic bodies. For example, the substrates can prevent display screen distortion by shielding a magnetic field that influences an electronic pen system (e.g., a digitizer) operated in an electromagnetic induction method. The substrates may be formed of a material that reacts with a magnetic force while reducing or interrupting an influence of a magnetic force and a magnetic field. The thicknesses or materials of the substrates may be changed according to the intensities of the magnetic forces of the magnetic bodies. For example, when the magnetic bodies are formed of magnets having a magnetic force of about 1000 G (gauss), the substrates may be provided such that the intensity of the magnetic force shown in a predetermined direction (for example, towards the electronic device) due to the magnets is lowered to a designated intensity (e.g., about 30 G) or lower.

The cover 10 may provide various folding states according to the locations of the support connector 230 and the stopper 240. For example, the cover 10 may support a folding state for typing, a folding state for touch, a folding state for viewing, a folding state for protection, a folding state for mounting, etc. In this regard, the ratio of the widths of the upper cover, the device connector 210, the support 220, the support connector 230, and the stopper 240 may be about 7.13 (0.65 to 0.75): 2.78 (2.5 to 3.5): 2.92 (2.5 to 3.5): 1 (0.5 to 1.5): 1.12 (0.5 to 1.5). The ratio of the widths of the elements may be changed according to the widths of the joints and the connectors.

Figure 4:
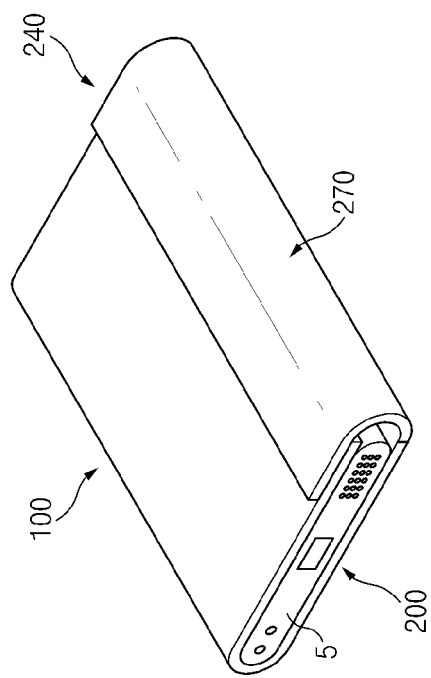
FIG. 4 illustrates a cover mounted on an electronic device according to an embodiment of the present disclosure.
Figure 4:
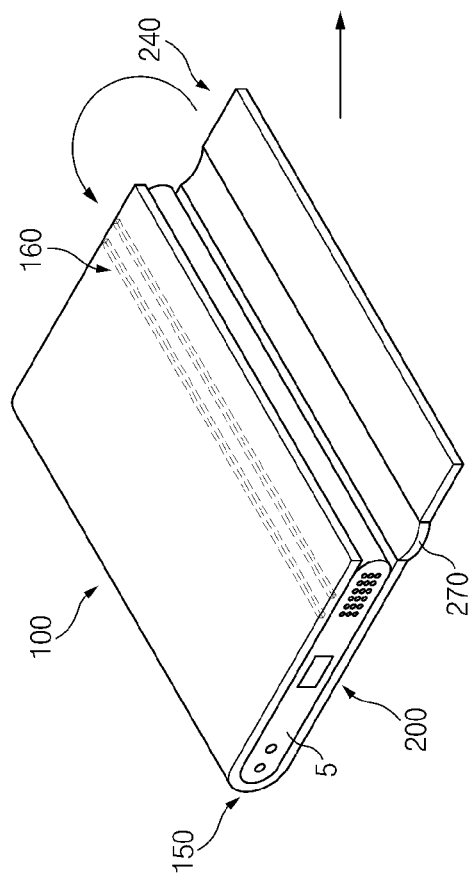

FIG. 4 illustrates a cover to which an electronic device is connected according to an embodiment of the present disclosure.

Referring to FIG. 4, the upper cover 100 of the cover 10 covers a front surface, e.g., a display surface, of an electronic device 5 and the lower cover 200 of the cover 10 covers a rear surface of the electronic device 5.

At least one groove (e.g., a rail groove or a guide groove) 160 is disposed on an upper surface of the upper cover 100. The groove 160 may function as a guide for a user to recognize the locations of the stopper 240, the support connector 230, and the support 220. The user may adjust the locations of the stopper 240, the support connector 230, the support 220, etc., while referring to the groove 160 in order to create a desired folding state (for example, a folding state for typing, a folding state for touch, a folding state for view, etc.) when disposing the stopper 240, the support connector 230, the support 220, etc., at a predetermined location of the upper cover 100.

The cover module 10 in the illustrating drawing may be disposed such that the upper cover 100 covers the display of the electronic device 5 as in the state of the left drawing. In this state, the stopper 240 may be disposed in parallel to the support connector 230. The stopper 240 may pivot using the stopper connector 270 as the pivot axis to cover a periphery of the upper cover 100 as illustrated in the right side drawing. Accordingly, the electronic device 5 may be protected by the cover 10.

The stopper 240 may maintain a contact state through magnetic force while folded onto the upper cover 100.

According to various embodiments of the present disclosure, there is provided an accessory device (for example, a cover module) disposed to cover at least a portion of an electronic device, the accessory device including a first member (for example, an upper cover) having a first size and a first shape and capable of covering at least a portion of a front surface of the electronic device or being disposed on a rear surface of the electronic device according to a folding state thereof, a second member (for example, a device connector) flexibly connected to the first member and capable of being coupled to at least a portion of the rear surface of the electronic device, a third member (for example, a support) flexibly connected to the second member and capable of being disposed to cover the rear surface of the electronic device or supporting the rear surface of the electronic device according to a folding state thereof, a fourth member (for example, a support connector) flexibly connected to the third member and capable of being disposed to cover the rear surface of the electronic device or supporting the third member according to a folding state thereof, and a fifth member (a stopper) flexibly connected to the fourth member and capable of making contact with the first member based on a magnetic field or supporting the fourth member by maintaining a contact state with the first member according to a folding state thereof.

According to various embodiments of the present disclosure, at least one of the first member, the fourth member, or the fifth member may include one or more magnetic bodies or materials attracted by a magnet.

According to various embodiments of the present disclosure, at least a portion of at least one of the second member or the third member may include a material which at least partially interrupts a magnetic field generated by the magnetic bodies or the magnet.

According to various embodiments of the present disclosure, the magnetic body or the material may include at least one of a ferromagnetic substance, an antiferromagnetic substance, or a ferrimagnetic substance.

According to various embodiments of the present disclosure, the accessory device may further include a fixing structure for detachably connecting the accessory to the electronic device.

According to various embodiments of the present disclosure, the fixing structure may be disposed in the second member.

According to various embodiments of the present disclosure, the accessory device may further include a guide wall disposed in the second member to guide a disposition location of the electronic device.

According to various embodiments of the present disclosure, the accessory device may further include at least one of a first connecting structure which connects the first member and the second member, a second connecting structure which connects the second member and the third member, a third connecting structure which connects the third member and the fourth member, or a fourth connecting structure which connects the fourth member and the fifth member.

According to various embodiments of the present disclosure, the fourth connecting structure may be larger than the first connecting structure.

According to various embodiments of the present disclosure, the first connecting structure may be larger than the second connecting structure and the third connecting structure.

According to various embodiments of the present disclosure, the size of the first member may be substantially the same as a total sum of the sizes of the second member, the third member, and the fourth member, and the sizes of the second connecting structure and the third connecting structure.

According to various embodiments of the present disclosure, the second member and the third member may be substantially the same, and the fourth member and the fifth member are substantially the same.

According to various embodiments of the present disclosure, the size of the first member may be larger than at least one of the second member or the third member.

According to various embodiments of the present disclosure, at least one of the fourth member or the fifth member may be smaller than at least one of the second is member or the third member.

According to various embodiments of the present disclosure, the first member may include a Hall IC magnet capable of recognizing a folding state of the first member in the electronic device.

According to various embodiments of the present disclosure, the accessory device further may include at least one groove formed on an outer surface of the first member to guide a contact location of the fourth member or the fifth member According to various embodiments of the present disclosure, there is provided an accessory device including a first member, a second member, a third member, a fourth member, and a fifth member which are connected to each other to be pivoted with respect to each other, wherein the first member is provided to cover the front surface of the electronic device, the second member is provided to be coupled to the electronic device, and the third member, the fourth member, and the fifth member are provided to maintain the holding angle of the electronic device according to a folding angle.

Figure 5A:
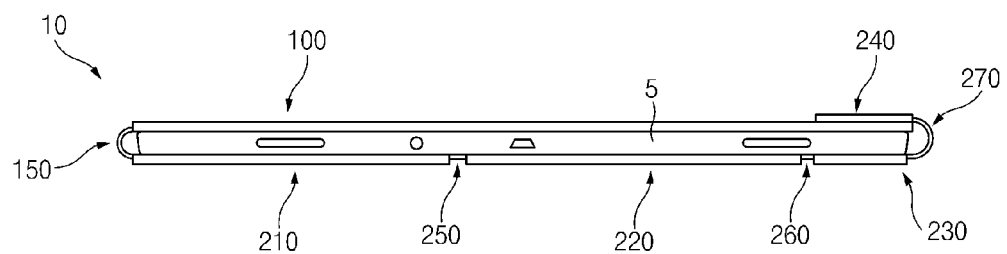
FIG. 5A illustrates a first folding state of a cover connected to an electronic device according to an embodiment of the present disclosure.

FIG. 5A illustrates a first folding state of a cover connected to an electronic device according to an embodiment of the present disclosure. The cover may be connected to a rear surface of the electronic device or may be incorporated in the electronic device as the rear surface thereof.

Referring to FIG. 5A, as illustrated in FIG. 4, the upper cover 100 may cover the front display of the electronic device 5. The cover connector 150, which is between the upper cover 100 and the lower cover 200, covers a side (e.g., the left side) of the electronic device 5.

The lower cover 200 covers the rear surface of the electronic device 5. Specifically, the device connector 210, the support 220, and the support connector 230 of the lower cover 200 cover the rear surface of the electronic device 5. The stopper connector 270 covers a side (e.g., the right side) of the electronic device 5. The stopper 240 covers one side of a periphery of the upper cover 100.

An area (for example, the left side) of the rear surface of the electronic device 5 is seated on the device connector 210, e.g., while being coupled to a coupling boss disposed in the device connector 210. Another area (for example, the right side) of the rear surface of the electronic device 5 may be disposed on the support 220 and the support connector 230. An interior surface of the upper cover 100 faces the display surface of the electronic device 5.

Figure 5B:
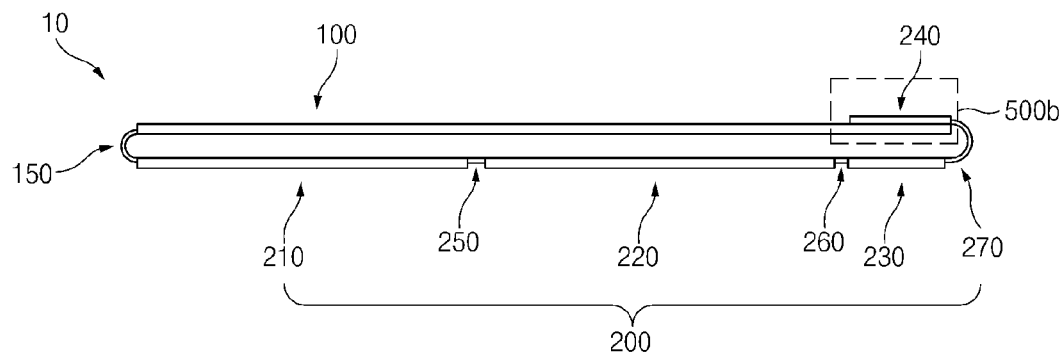
FIG. 5B illustrates a cover in the first folding state according to an embodiment of the present disclosure.

FIG. 5B illustrates a cover in the first folding state according to an embodiment of the present disclosure. Specifically, FIG. 5B illustrates the same cover illustrated in FIG. 5A, except that the electronic device 5 is not connected thereto. Accordingly, a repetitive description thereof is omitted.

Referring to FIG. 5B, the inside and outside of the cover 10 may be formed of the same material or different materials. The cover module 10 may be disposed such that the outer surface of the upper cover 100 faces the upper side, and may be disposed such that the inner surface of the upper cover 100 faces the lower side (for example, an area in which the electronic device is disposed). Accordingly, the upper magnetic substrate disposed in the upper cover 100 and a peripheral area in which the first upper magnetic body is disposed may be disposed in a right peripheral area of the upper cover 100. The cover connector 150 which connects the upper cover 100 and the lower cover 200 may be disposed on the left side, and the stopper connector 270 may be disposed on the right side. The inside of the cover module 10 may be formed, for example, of a leather material, and the outside of the cover module 10 may be formed of a fabric material. Further, the inside and outside of the cover module 10 may be formed of the same material.

In the lower cover 200 according to an embodiment of the present disclosure, the device connector 210 may be disposed on the left side of the lower cover 200 and the support 220 may be disposed at a central portion of the lower cover 200. The support connector 230 connected to the support 220 may be disposed at a right periphery of the lower cover 200 while being disposed on the right side of the support 220. The stopper 240 may be disposed to overlap one side of the upper cover 100 while maintaining a connection through the stopper connector 270. According to an embodiment of the present disclosure, the inner surface of the stopper 240 may make contact with the outer surface of a periphery of the upper cover 100.

Figure 5C:
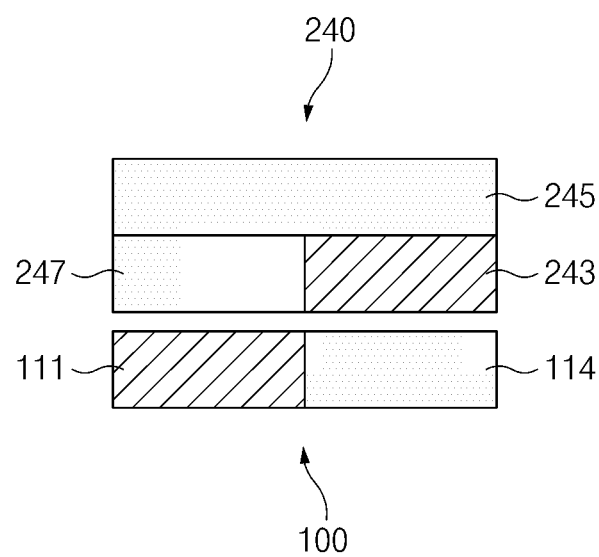
FIG. 5C illustrates a stopper and a magnetic body in area 500b of FIG. 5B corresponding to an upper cover in the first folding state according to an embodiment of the present disclosure.

FIG. 5C illustrates a stopper and a magnetic body in area 500b of FIG. 5B corresponding to an upper cover in the first folding state according to an embodiment of the present disclosure.

Referring to FIG. 5C, a periphery of the upper cover 100 is overlapped by the stopper 240. The periphery of the upper cover 100 includes the upper magnetic substrate 114 and the first upper magnetic body 111. As described above, the periphery of the upper cover 100 may be configured such that the first upper magnetic body 111 is disposed on the left side as illustrated because the first upper magnetic body 111 is on the left side of the upper magnetic substrate 114. The upper magnetic substrate 114 may include at least one hole in which the first upper magnetic body 111 is disposed, and may also include an area other than the hole. The upper magnetic substrate 114 may include, for example, a magnetic field shielding sheet or a substrate (for example, a metallic steel plate, a magnetized alloy, or a magnetized synthetic nonmetallic material) that shields a magnetic field.

The stopper 240 includes the second stopper substrate 247, the third stopper substrate 245, and the stopper magnetic body 243. Additionally, as illustrated in FIG. 2, the stopper 240 may further include a first stopper substrate 241 formed, for example, of a synthetic resin and provided such that other substrates and magnetic bodies are disposed therein. The second stopper substrate 247 faces the upper cover 100. The second stopper substrate 247 may include, for example, a hole provided on a substrate (e.g., a steel plate) having a magnetic property. The stopper magnetic body 243 (e.g., a coin type permanent magnet) may be partially disposed in the hole. The third stopper substrate 245 may be disposed on the upper surface of the second stopper substrate 247. The third stopper substrate 245 may be disposed such that the stopper magnetic body 243 hides an exposed surface.

In the cover 10, the first upper magnetic body 111 of the upper cover 100 faces the second stopper substrate 247 of the stopper 240. Further, the upper magnetic substrate 114 of the upper cover 100 may face the stopper magnetic body 243 of the stopper 240. Accordingly, the cover 10 may support the first folding state by applying an attractive force while a periphery of the upper cover 100 contacts one side of the stopper 240, regardless of the polarity of the magnetic body. Further, in the cover 10, the upper magnetic substrate 114 and the stopper substrate 242 can prevent leakage of a magnetic field (e.g., a state which influences the electronic device) of the magnetic body (e.g., the stopper magnetic body 243 or the first upper magnetic body 111).

Figure 5D:
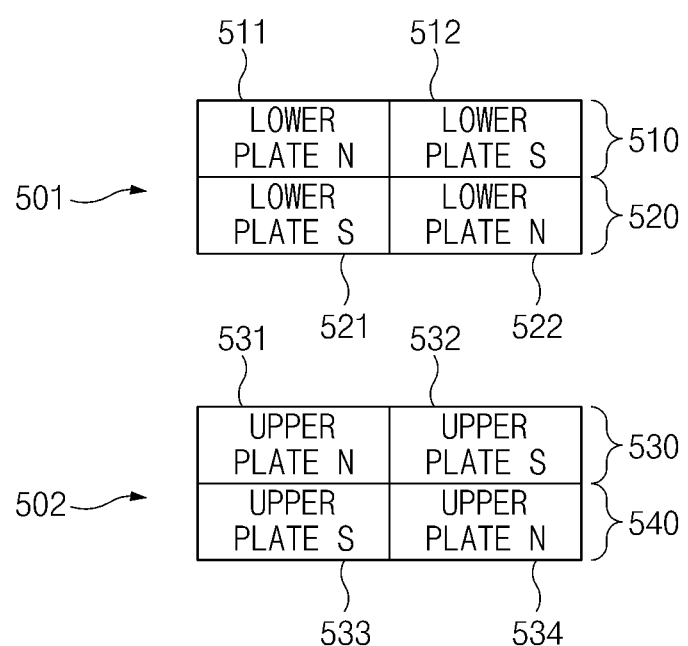
FIG. 5D illustrates a stopper and a magnetic body of an upper cover in the first folding state according to an embodiment of the present disclosure.

FIG. 5D illustrates a stopper and a magnetic body of an upper cover in the first folding state according to an embodiment of the present disclosure.

Referring to FIG. 5D, a magnetic body form 501 corresponding to the stopper 240 includes a first stopper layer 510 in which an 11-th stopper magnetic body 511 (e.g., a lower plate N) having a first polarity and a 12-th stopper magnetic body 512 (e.g., a lower plate S) having a second polarity are disposed, and a second stopper layer 520 in which a 21-st stopper magnetic body 521 (e.g., a lower plate S) having the second polarity and a 22-nd stopper magnetic body 522 (e.g., a lower plate N) are disposed under the first stopper layer 510. The 11-th stopper magnetic body 511 may overlap the 21-st stopper magnetic body 521, and the 12-th stopper magnetic body 512 may overlap the 22-nd stopper magnetic body 522.

Further, a magnetic body form 502 corresponding to the upper cover 100 includes a first upper layer 530 in which an 11-th upper magnetic body 531 (e.g., an upper plate N) having the first polarity and a 12-th upper magnetic body 532 (e.g., an upper plate S) having the second polarity, and a second upper layer 540 in which a 21-st upper magnetic body 533 (e.g., an upper plate S) having the second polarity and a 22-nd upper magnetic body 534 (e.g., an upper plate N) having the first polarity are disposed under the first upper layer 530. The 11-th stopper magnetic body 531 may overlap the 21-st stopper magnetic body 533, and the 12-th stopper magnetic body 532 may be disposed to overlap the 22-nd stopper magnetic body 534.

When the magnetic body form 501 covers the magnetic body form 502 (e.g., when the stopper 240 contacts the periphery of the upper cover 100 as illustrated in FIG. 5B), the 11-th upper magnetic body 531 having the first polarity overlaps the 21-st stopper magnetic body 521, and the 12-th upper magnetic body 532 having the second polarity overlaps the 22-nd stopper magnetic body 522 having the first polarity.

Figure 6A:
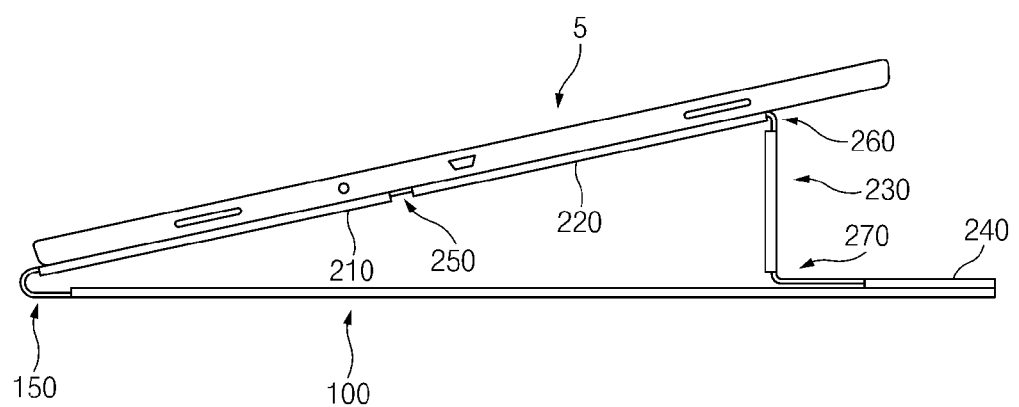
FIG. 6A illustrates a second folding state of a cover connected to an electronic device according to an embodiment of the present disclosure.

FIG. 6A illustrates a second folding state of a cover connected to an electronic device according to an embodiment of the present disclosure. Specifically, in the second folding state (e.g., a folding state for typing), the cover 10 supports the electronic device 5 at a predetermined inclination (or angle) from the bottom surface (or a surface on which the upper cover 100 is positioned) to face the front side, and the support connector 230 is erected vertically or at a specific angle. Accordingly, the user may easily perform various writing operations on the front surface of the display.

Referring to FIG. 6A, the upper cover 100 is folded towards the rear surface of the lower cover 200, using the cover connector 150 as the pivot axis thereof. Accordingly, the interior of the cover connector 150 is now exposed to the outside.

At least a portion of the lower cover 200 according to an embodiment of the present disclosure may be disposed to cover the rear surface of the electronic device 5. For example, the device connector 210 and the support 220 of the lower cover 200 cover the rear surface of the electronic device 5, and the support connector 230 of the lower cover 200 is rests perpendicularly on the upper cover 100 (or having a specific angle). The stopper 240 of the lower cover 200 overlaps a periphery of the upper cover 100. The stopper connector 270 connects the support connector 230 and the stopper 240 and helps the support connector 230 support the electronic device 5 at a specific angle (e.g., within a range of 10 degrees) with respect to the stopper 240.

An area of the rear surface of the electronic device 5 according to an embodiment of the present disclosure may be seated on the device connector 210, the support 220, and the like. Another area (for example, a right peripheral portion) of the rear surface of the electronic device 5 may be exposed while being spaced apart from the bottom surface by a predetermined interval. Accordingly, the display surface of the electronic device 5 may be exposed towards the upper side while being inclined at a specific angle.

The cover module 10 in the second folding state (for example, a folding state for typing) according to an embodiment of the present disclosure is configured such that the display of the electronic device 5 is disposed at a predetermined inclination (or angle) from the bottom surface (or a surface on which the upper cover 100 is positioned) to face the front side, and the support connector 230 is erected vertically or at a specific angle. Accordingly, the user may easily perform various writing operations on the front surface of the display.

FIG. 6B illustrates a cover module in the second folding state according to an embodiment of the present disclosure. Specifically, FIG. 6B illustrates the same cover illustrated in FIG. 6A, except that the electronic device 5 is not connected thereto. Accordingly, a repetitive description thereof is omitted.

Referring to FIG. 6B, the cover module 10 may be disposed such that the inner surface of the upper cover 100 faces the bottom, and may be disposed such that the outer surface of the upper cover 100 faces the upper side (for example, an area in which the electronic device is disposed or the rear surface of the lower cover 200). In the illustrated drawings, the upper magnetic substrate disposed in the upper cover 100 and a peripheral area in which the first upper magnetic body is disposed may be disposed in a right peripheral area of the upper cover 100. The cover connector 150 which connects the upper cover 100 and the lower cover 200 may be disposed on the left side, and the stopper connector 270 may be positioned on the upper cover 100.

The support connector 230 connected to the stopper connector 270 according to an embodiment of the present disclosure may be disposed, for example, perpendicularly (or having a predetermined inclination) to the front surface of the upper cover 100. Because the stopper connector 270 maintains a predetermined tension and the stopper 240, to which the stopper connector 270 is connected, is fixed to a periphery of the upper cover 100 by a magnetic force, the stopper connector 270 may perform a function of supporting the support connector 230 towards the cover connector 150. Accordingly, the support connector 230 may be disposed perpendicularly (or having a predetermined inclination) by the stopper connector 270.

The right end of the support 220 according to an embodiment of the present disclosure may be maintained while having a predetermined inclination through support of the support connector 230, while being connected to an upper end of the support connector 230 through the second joint 260. The device connector 210 and the support 220 may be connected to each other through the first joint 250, and may support the electronic device by a tension of the first joint 250 such that the electronic device is disposed to have a predetermined inclination.

Figure 6C:
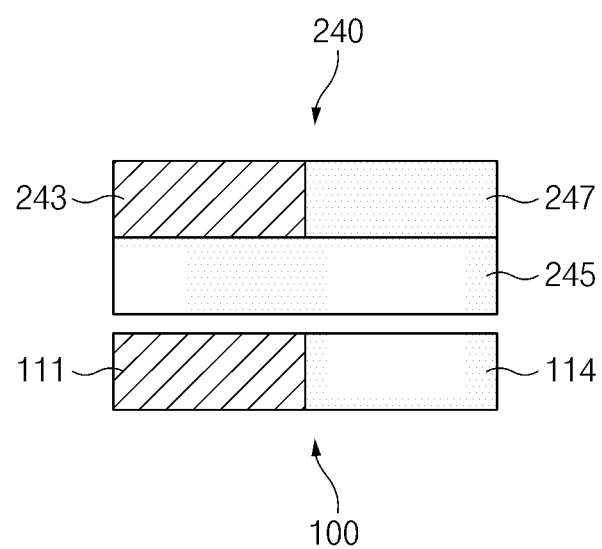
FIG. 6C illustrates a stopper and a magnetic body in area 600b of FIG. 6B corresponding to an upper cover in the second folding state according to an embodiment of the present disclosure.

FIG. 6C illustrates a stopper and a magnetic body in area 600b of FIG. 6B corresponding to an upper cover in the second folding state according to an embodiment of the present disclosure.

Referring to FIG. 6C, the periphery of the upper cover 100 includes the upper magnetic substrate 114 and the first upper magnetic body 111. Because the rear surface of the upper cover 100 faces the rear surface of the lower cover 200, the upper magnetic substrate 114 of the upper cover 100 may be disposed on the right side of the first upper magnetic body 111.

As described above, the stopper 240 includes the second stopper substrate 247, the third stopper substrate 245, and the stopper magnetic body 243.

The second stopper substrate 247 and the stopper magnetic body 243 are disposed on the third stopper substrate 245. For example, the stopper magnetic body 243 is disposed on the left side of the second stopper substrate 247 and the third stopper substrate 245 faces the upper cover 100.

In the second folding state, the first upper magnetic body 111 of the upper cover 100 faces the third stopper substrate 245 of the stopper 240 and the first upper magnetic body 111 is fixed to the third stopper substrate 245 by magnetic force of the first upper magnetic body 111.

According to a vertical disposition of the support connector 230, the electronic device and the stopper 240 may be spaced apart from each other by a designated distance, such that the electronic device 5 is not be influenced by a magnetic field from the stopper magnetic body 243.

Figure 6D:
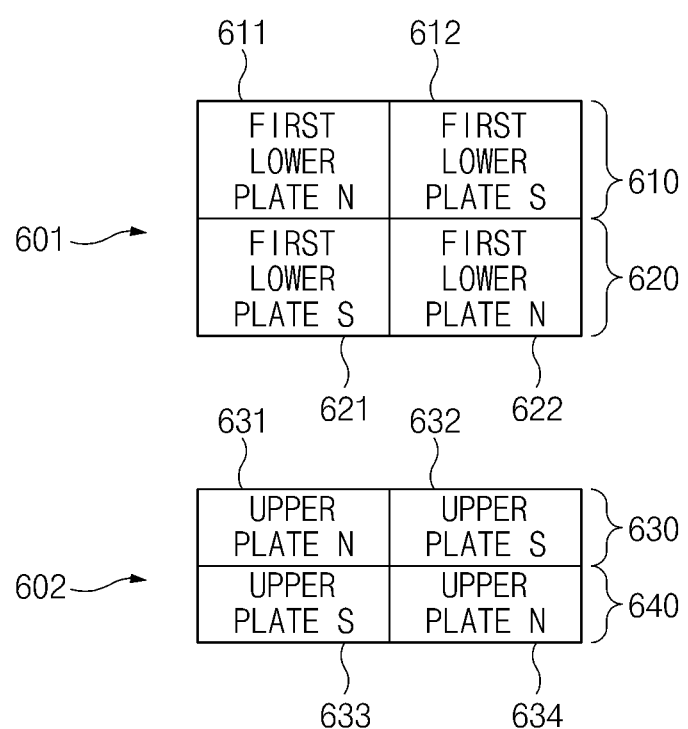
FIG. 6D illustrates a stopper and a magnetic body of an upper cover in the second folding state according to an embodiment of the present disclosure.

FIG. 6D illustrates a stopper and a magnetic body of an upper cover in the second folding state according to an embodiment of the present disclosure.

Referring to FIG. 6D, a magnetic body form 601 corresponding to the stopper 240 includes a first stopper layer 610 in which an 11-th stopper magnetic body 611 (e.g., a first lower plate N) having the first polarity and a 12-th stopper magnetic body 612 (e.g., a first lower plate S) having the second polarity are disposed, and a second stopper layer 620 in which a 21-st stopper magnetic body 621 (e.g., a first lower plate S) having the second polarity and a 22-nd stopper magnetic body 622 (e.g., a first lower plate N) having the first polarity are disposed under the first stopper layer 610. The 11-th stopper magnetic body 611 overlaps the 21-nd stopper magnetic body 621, and the 12-th stopper magnetic body 612 overlaps the 22-nd stopper magnetic body 622. Further, the magnetic body form 602 corresponding to the upper cover 100 includes a first upper layer 630 in which an 11-th upper magnetic body 631 (e.g., an upper plate N) having the first polarity and a 12-th upper magnetic body 632 (e.g., an upper plate S) having the second polarity, and a second upper layer 640 in which a 21-st upper magnetic body 633 (e.g., an upper plate S) having the second polarity and a 22-nd upper magnetic body 634 (e.g., an upper plate N) having the first polarity are disposed under the first upper layer 630. The 11-th stopper magnetic body 631 overlaps the 21-st stopper magnetic body 633, and the 12-th stopper magnetic body 632 overlaps the 22-nd stopper magnetic body 634.

When the magnetic body form 601 covers the magnetic body form 602 (e.g., when the stopper 240 contacts the periphery of the upper cover 100 as illustrated FIG. 6B), the 21-st stopper magnetic body 621 having the second polarity overlaps the 11-th upper magnetic body 631 having the first polarity, and the 22-nd stopper magnetic body 622 having the first polarity overlaps the 12-th upper magnetic body 632 having the second polarity.

Figure 7A:
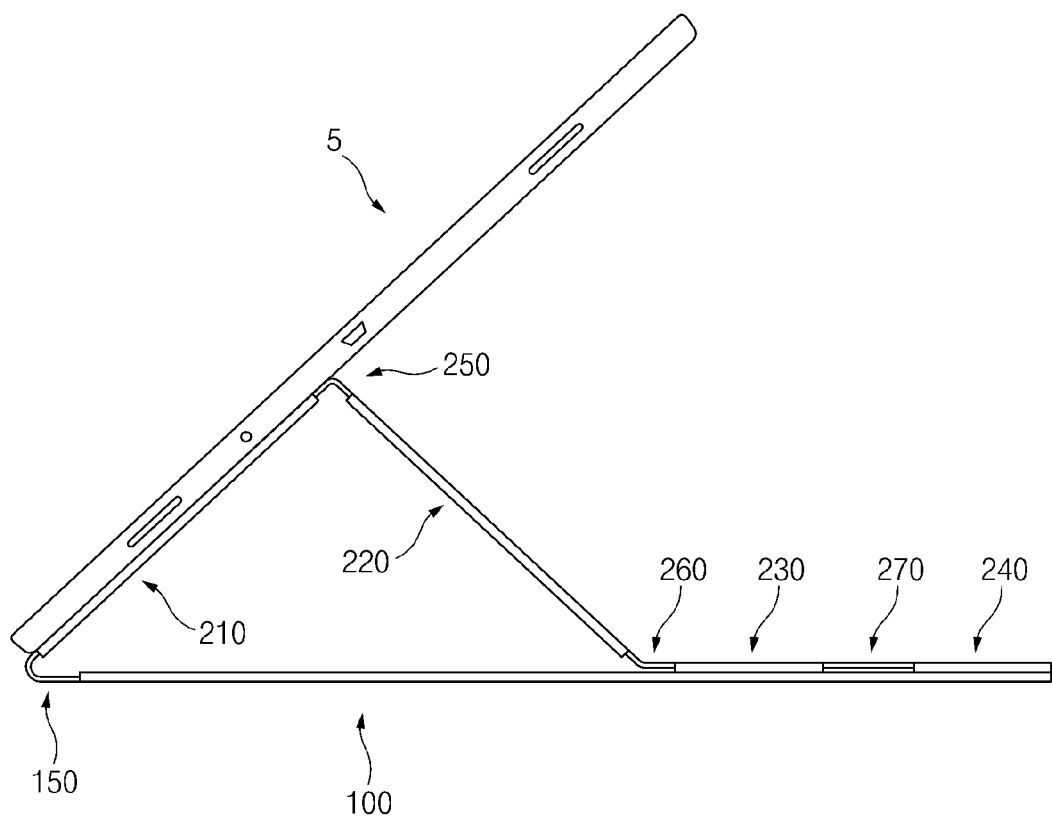
FIG. 7A illustrates a third folding state of a cover connected to an electronic device according to an embodiment of the present disclosure.

FIG. 7A illustrates a third folding state of a cover connected to an electronic device according to an embodiment of the present disclosure.

Referring to FIG. 7A, the upper cover 100 is folded towards the rear surface of the lower cover 200, using the cover connector 150 as the pivot axis thereof.

The device connector 210 of the lower cover 200 covers a portion of the rear surface of the electronic device 5. The support 220 of the lower cover 200, which is connected to the device connector 210 through the first joint 250, supports one side of the rear surface of the electronic device 5.

The support connector 230 and the stopper 240 of the lower cover 200 overlap the periphery of the upper cover 100.

While the support connector 230 and the stopper 240 contact the upper cover 100, the support connector 230 may support one side of the support 220. Further, an opposite side of the support 220 may support the rear surface of the electronic device 5. Accordingly, the support 220 is disposed at a predetermined inclination to support the electronic device 5 at a specific angle (e.g., in a range within 30 degrees). An area of the rear surface of the electronic device 5 according to an embodiment of the present disclosure may be seated on the device connector 210. Another area (for example, a right periphery) of the rear surface of the electronic device 5 may be spaced apart from the support 220 to be spaced apart from the bottom surface on which the upper cover 100 is disposed at a predetermined interval. Accordingly, the display surface of the electronic device 5 is inclined at a specific angle.

In the third folding state (e.g., a folding state for touch inputs), the cover 10 supports the electronic device 5 at a specific angle inclination (e.g., an angle larger than that of the second folding state) from the bottom surface (or a surface on which the upper cover 100 is positioned). Accordingly, the user may easily perform various touch operations on the display surface of the electronic device 5.

Figure 7B:
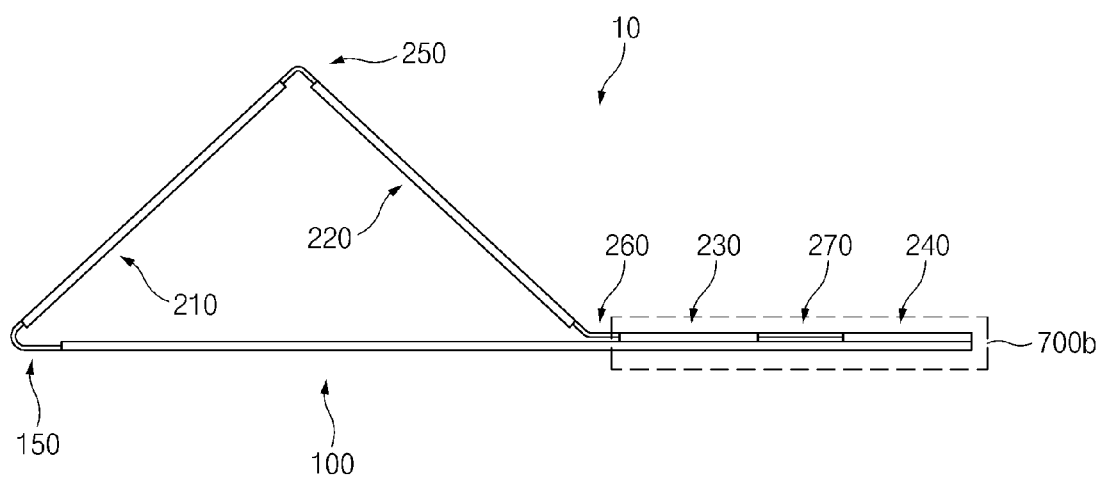
FIG. 7B illustrates a cover in the third folding state according to an embodiment of the present disclosure.

FIG. 7B illustrates a cover in the third folding state according to an embodiment of the present disclosure. Specifically, FIG. 7B illustrates the same cover illustrated in FIG. 7A, except that the electronic device 5 is not connected thereto.

Referring to FIG. 7B, the cover module 10 may be disposed such that the inner surface of the upper cover 100 faces the bottom, and may be disposed such that the outer surface of the upper cover 100 faces the upper side (for example, an area in which the electronic device is disposed or the rear surface of the lower cover 200). In the illustrated drawings, the upper magnetic substrate disposed in the upper cover 100 and a peripheral area in which the first upper magnetic body and the second upper magnetic body are disposed may be disposed in a right peripheral area of the upper cover 100. The cover connector 150 which connects the upper cover 100 and the lower cover 200 may be disposed on the left side, and the support connector 230 and the stopper 240 may be positioned on the upper cover 100.

According to an embodiment of the present disclosure, the support connector 230 and the stopper 240 may be positioned at a predetermined location on the upper cover 100 according to the folding state of the cover module. According to an embodiment of the present disclosure, the stopper 240 may be arranged at a right periphery of the upper cover 100 (for example, disposed such that the corner of the stopper 240 and the right corner of the upper cover 100 are adjacent). The support connector 230 may be disposed on the upper cover 100 in parallel to the stopper 240 while being connected to the stopper connector 270. According to an embodiment of the present disclosure, the support connector 230 may be disposed at a location where the second upper magnetic body 112 of the upper cover 100 is disposed. The stopper connector 270 may be disposed in parallel to a surface on which the upper cover 100 is positioned on the upper cover 100.

The left end of the support 220 according to an embodiment of the present disclosure is connected to the second device connector 210 through the first joint 250 and may be inclined at a predetermined inclination. The right end of the support 220 may be maintained while having a predetermined inclination through support of the support connector 230, while being connected to an end of the support connector 230 through the second joint 260.

Figure 7C:
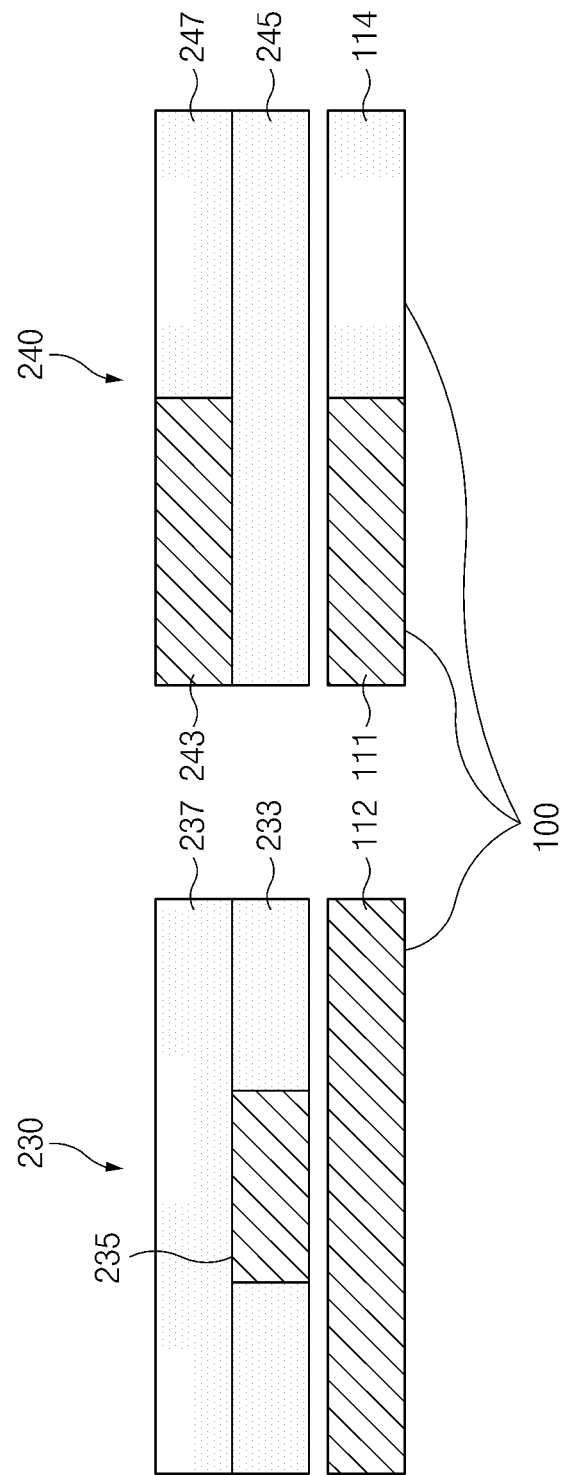
FIG. 7C illustrates a stopper and a magnetic body in area 700b of FIG. 7B corresponding to an upper cover in the third folding state according to an embodiment of the present disclosure.

FIG. 7C illustrates a stopper and a magnetic body in area 700b of FIG. 7B corresponding to an upper cover in the third folding state according to an embodiment of the present disclosure.

Referring to FIG. 7C, both of the support connector 230 and the stopper 240 overlap the upper cover 100. The area in which the support connector 230 and the stopper 240 contact the upper cover 100 by a magnetic force includes the upper magnetic substrate 114, the first upper magnetic body 111, and the second upper magnetic body 112. Because the rear surface of the upper cover 100 faces the rear surface of the lower cover 200, the upper magnetic substrate 114 of the upper cover 100 may be disposed on the right side of the first upper magnetic body 111.

As described above, the stopper 240 includes the second stopper substrate 247, the third stopper substrate 245, and the stopper magnetic body 243.

In the third folding state, the stopper 240 contacts with the upper magnetic substrate 114 and the first upper magnetic body 111 of the upper cover 100 based on a magnetic force, as described above with reference to FIG. 6. Additionally, the support connector 230 contacts the upper cover 100.

As illustrated in FIG. 2, the support connector 230 includes the second support connecting substrate 237, the third support connecting substrate 233, and the support connecting magnetic body 235. Additionally, the support connector 230 may include a first support connecting substrate on which the substrates may be disposed. The second support connecting substrate 237 is disposed on the third support connecting substrate 233. The support connecting magnetic body 235 is disposed, for example, in the one or more holes disposed at a central portion of the third support connecting substrate 233. Accordingly, the support connector 230 is configured such that the support connecting magnetic bodies 235 are disposed at the center of the third support connecting substrate 233.

In the third folding state, the third support connecting substrate 233 contacts the second upper magnetic body 112 based on magnetic force. The support connecting magnetic body 235 may also contact the second upper magnetic body 112 based on a magnetic force. Mutually contacting surfaces of the support connecting magnetic body 235 and the second upper magnetic body 112 may have opposite polarities so that the support connecting magnetic body 235 and the second upper magnetic body 112 make contact with each other by a magnetic force.

Figure 7D:
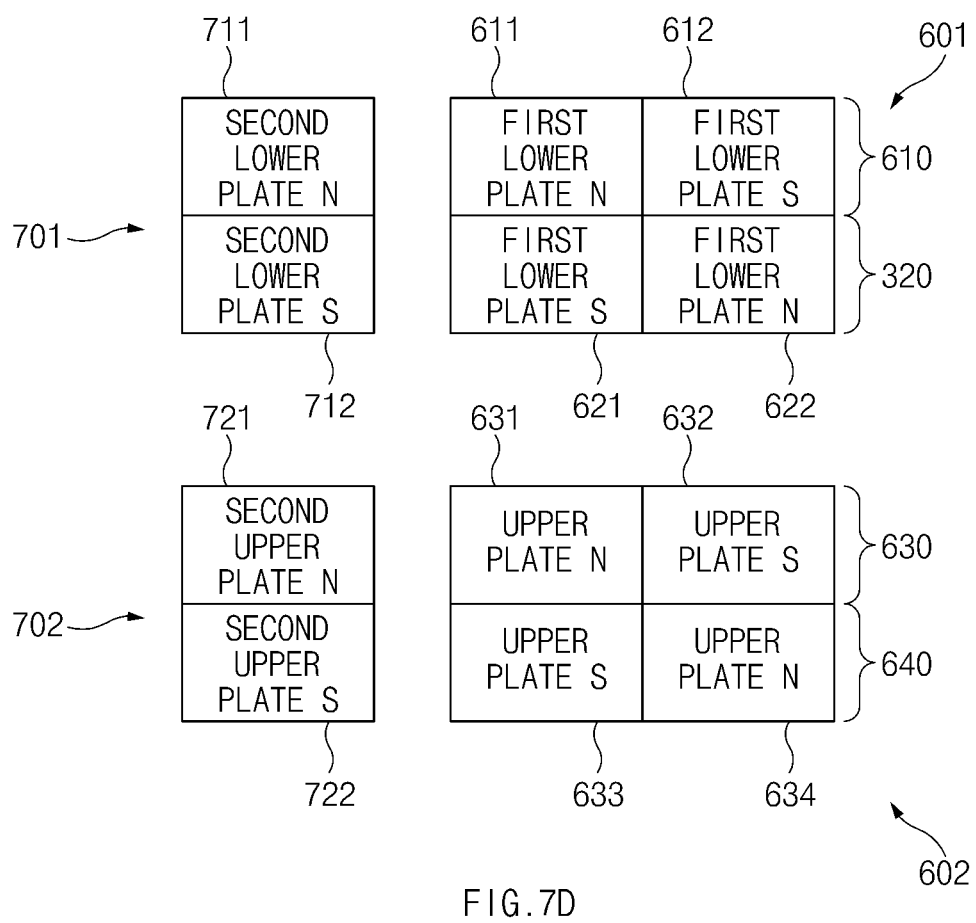
FIG. 7D illustrates a support connector, a stopper, and a magnetic body of an upper cover in the third folding state according to an embodiment of the present disclosure.

FIG. 7D illustrates a support connector, a stopper, and a magnetic body of an upper cover in the third folding state according to an embodiment of the present disclosure.

Referring to FIG. 7D, the magnetic body form 601 corresponding to the stopper 240 and the magnetic body form 602 corresponding to the upper cover 100 have already been described above with reference FIG. 6D. Accordingly, a repetitive description thereof is omitted.

A magnetic body form 701 corresponding to the support connector 230 includes a first support connecting magnetic body 711 (e.g., a second lower plate N) having the first polarity and a second support connecting magnetic body 712 (e.g., a second lower plate S) having the second polarity disposed under the first support connecting magnetic body 711.

Further, a magnetic body form 702 corresponding to the second upper magnetic body of the upper cover 100 includes a 71-st upper magnetic body 721 (e.g., a second upper plate N) having the first polarity, and a 72-nd upper magnetic body 722 (e.g., a second upper plate S) having the second polarity disposed under the 71-st upper magnetic body 721.

In the third folding state, the second support connecting magnetic body 712 having the second polarity faces the 71-st upper magnetic body 721 having the first polarity to make contact with the 71-th upper magnetic body 721 having the first polarity based on a magnetic force.

Figure 8A:
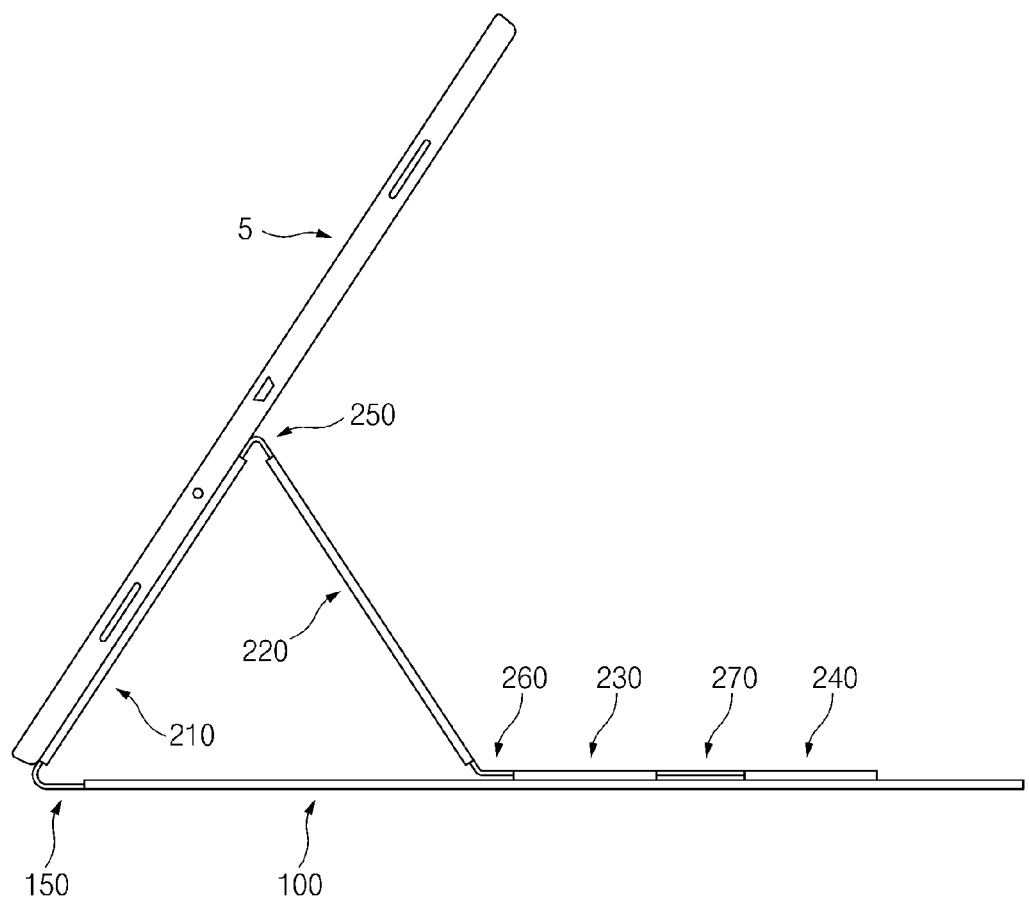
FIG. 8A illustrates a fourth folding state of a cover connected to an electronic device according to an embodiment of the present disclosure.

FIG. 8A illustrates a fourth folding state of a cover connected to an electronic device according to an embodiment of the present disclosure.

Referring to FIG. 8A, the upper cover 100 is folded towards the rear surface of the lower cover 200, using the cover connector 150 as the pivot axis thereof.

Similar to FIG. 7A, the device connector 210 of the lower cover 200 covers a portion of the rear surface of the electronic device 5. The support 220 of the lower cover 200, which is connected to the device connector 210 through the first joint 250, supports the rear surface of the electronic device 5 or the device connector 210 to deviate from the rear surface of the electronic device 5, such that the electronic device 5 is supported at a specific angle.

Similar to FIG. 7A, the support connector 230 and the stopper 240 of the lower cover 200 overlap the upper cover 100. However, different from FIG. 7A, the support connector 230 and the stopper 240 of the lower cover 200 overlap the upper cover 100 at positions closer to the cover connector 150, such that such that the electronic device 5 is supported at a greater angle than in FIG. 7A.

The stopper 240 may contact the upper cover 100 by magnetic force at a location (e.g., the second upper magnetic body 112). The support connector 230 may maintain a magnetic force based contact state with the upper cover 100 at the third upper magnetic body 113, as the support connector 230 is situated to the left of the stopper 240.

While the support connector 230 and the stopper 240 contact with the upper cover 100, the support connector 230 may support the support 220. Because the support connector 230 is fixed to a central area of the upper cover 100 by a magnetic force, the support 220 supported by the support connector 230 may support the electronic device 5 at a specific angle (e.g., in a range within 40 degrees). Accordingly, An area of the rear surface of the electronic device 5 according to an embodiment of the present disclosure may be seated on the device connector 210. Another area (for example, a right periphery) of the rear surface of the electronic device 5 may be spaced apart from the support 220 to be spaced apart from the bottom surface on which the upper cover 100 is disposed at a predetermined interval. The display surface of the electronic device may 5 be inclined at a specific angle (e.g., an inclination larger than that of the third folding state).

In the fourth folding state (for example, a folding state for viewing), the cover 10 may support the display surface of the electronic device 5 at a specific angle inclination (for example, an angle larger than that of the third folding state) from the bottom surface (or a surface on which the upper cover 100 is positioned). Accordingly, the user may easily perform various screen operations or watch images through the display inclined at a predetermined inclination.

Figure 8B:
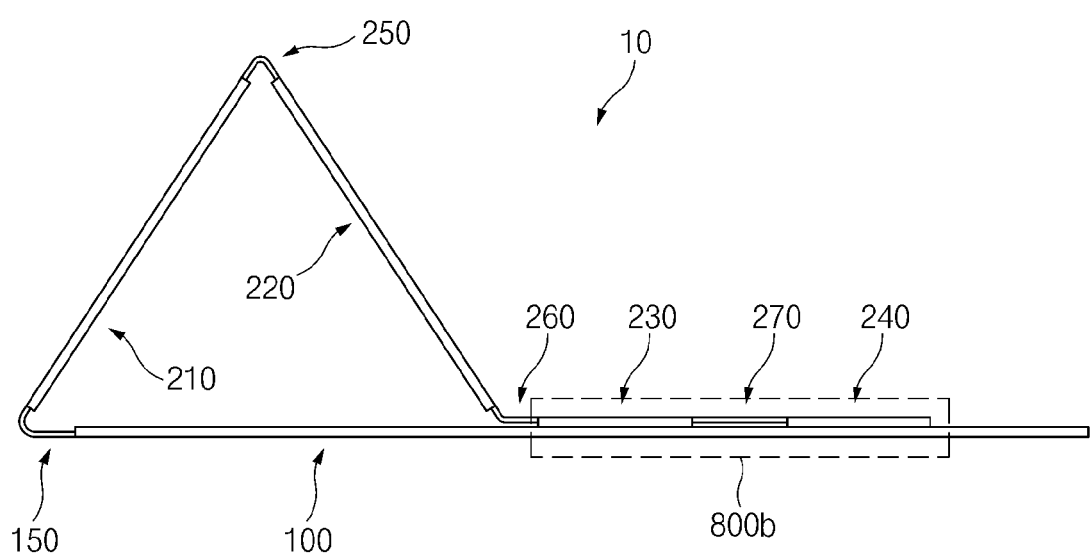
FIG. 8B illustrates a cover module in the fourth folding state according to an embodiment of the present disclosure.

FIG. 8B illustrates cover module in the fourth folding state according to an embodiment of the present disclosure. Specifically, FIG. 8B illustrates the same cover illustrated in FIG. 8A, except that the electronic device 5 is not connected thereto.

Referring to FIG. 8B, the cover module 10 may be disposed such that the inner surface of the upper cover 100 faces the bottom, and may be disposed such that the outer surface of the upper cover 100 faces the upper side (for example, an area in which the electronic device is disposed or the rear surface of the lower cover 200). The cover connector 150 which connects the upper cover 100 and the lower cover 200 may be disposed on the left side, and the support connector 230 and the stopper 240 may be positioned on the upper cover 100. According to an embodiment of the present disclosure, the stopper 240 may make contact with the upper cover 100 by a magnetic force at a location (a location where the second upper magnetic body is disposed) spaced from a right periphery of the upper cover 100 by a predetermined interval. The support connector 230 disposed on the left side of the stopper 240 may make contact with the upper cover 100 by a magnetic force at a location (a location where the third upper magnetic body is disposed) moved from a point where the stopper 240 makes contact towards the cover connector 150.

Figure 8C:
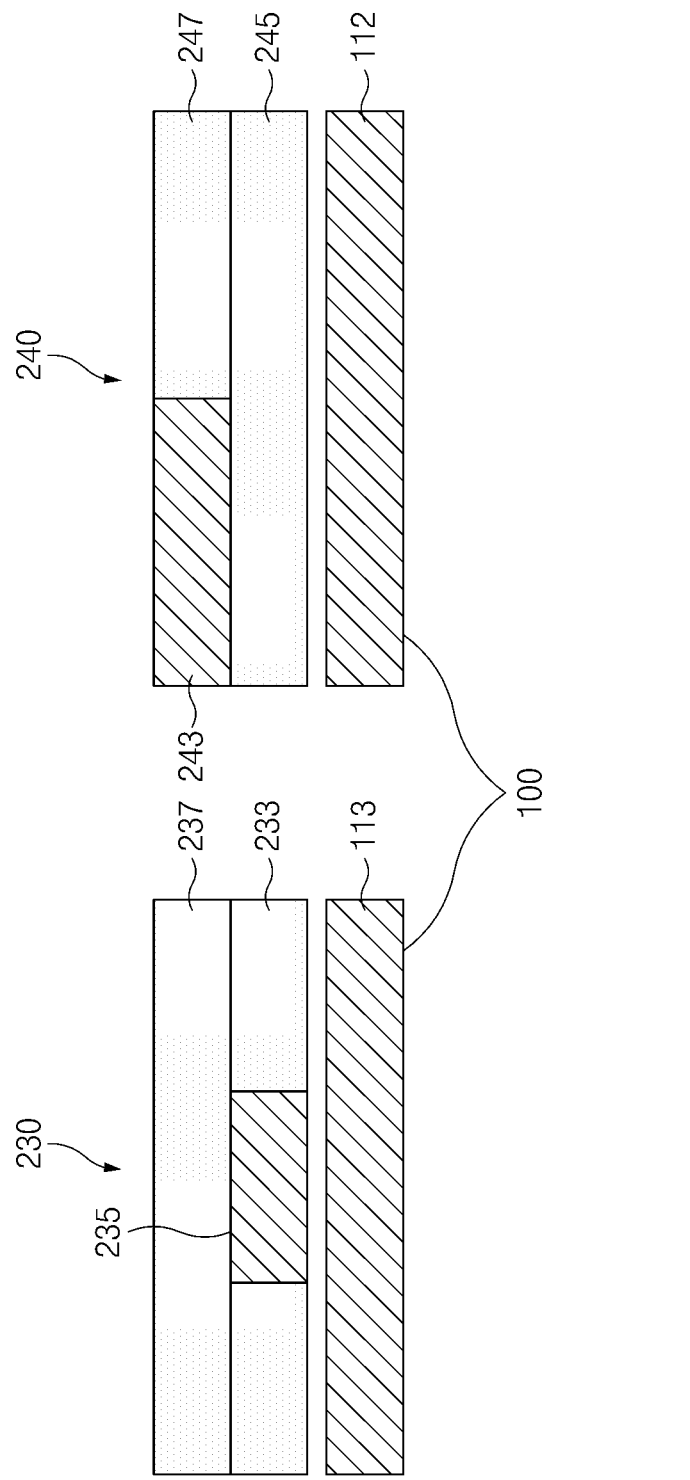
FIG. 8C illustrates a stopper and a magnetic body in area 800b of FIG. 8B corresponding to an upper cover in the fourth state according to an embodiment of the present disclosure.

FIG. 8C illustrates a stopper and a magnetic body in area 800b of FIG. 8B corresponding to an upper cover according to an embodiment of the present disclosure.

Referring to FIG. 8C, the support connector 230 and the stopper 240 overlap the upper cover 100. Specifically, the support connector 230 and the stopper 240 contact the upper cover 100 by magnetic force at the third upper magnetic body 113 and the second upper magnetic body 112, respectively. Because the rear surface of the upper cover 100 faces the rear surface of the lower cover 200, the third upper magnetic body 113 of the upper cover 100 may be disposed on the left side of the second upper magnetic body 112.

As described above, the stopper 240 includes the second stopper substrate 247, the third stopper substrate 245, and the stopper magnetic body 243. In the fourth folding state, the third stopper substrate 245 of the stopper 240 contacts with the second upper magnetic body 112 of the upper cover 100, based on a magnetic force.

As described above, the support connector 230 includes the second support connecting substrate 237, the third support connecting substrate 233, and the support connecting magnetic body 235. Additionally, the support connector 230 may further include a substrate (for example, a first support connecting substrate 231) on which the substrates may be disposed. The second support connecting substrate 237 may be situated on the third support connecting substrate 233 in the fourth folding state in the illustrated drawing. The third support connecting substrate 233 may be situated under the second support connecting substrate 237 in the fourth folding state in the illustrated drawing. The support connecting magnetic bodies 235 may be disposed, for example, in the one or more holes disposed at a central portion of the third support connecting substrate 233. The third support connecting substrate 233 and the support connecting magnetic body 235 contact the third upper magnetic body 113 based on a magnetic force. Mutually contacting surfaces of the support connecting magnetic body 235 and the third upper magnetic body 113 may have opposite polarities so that the support connecting magnetic body 235 and the third upper magnetic body 113 contact each other by a magnetic force.

Figure 8D:
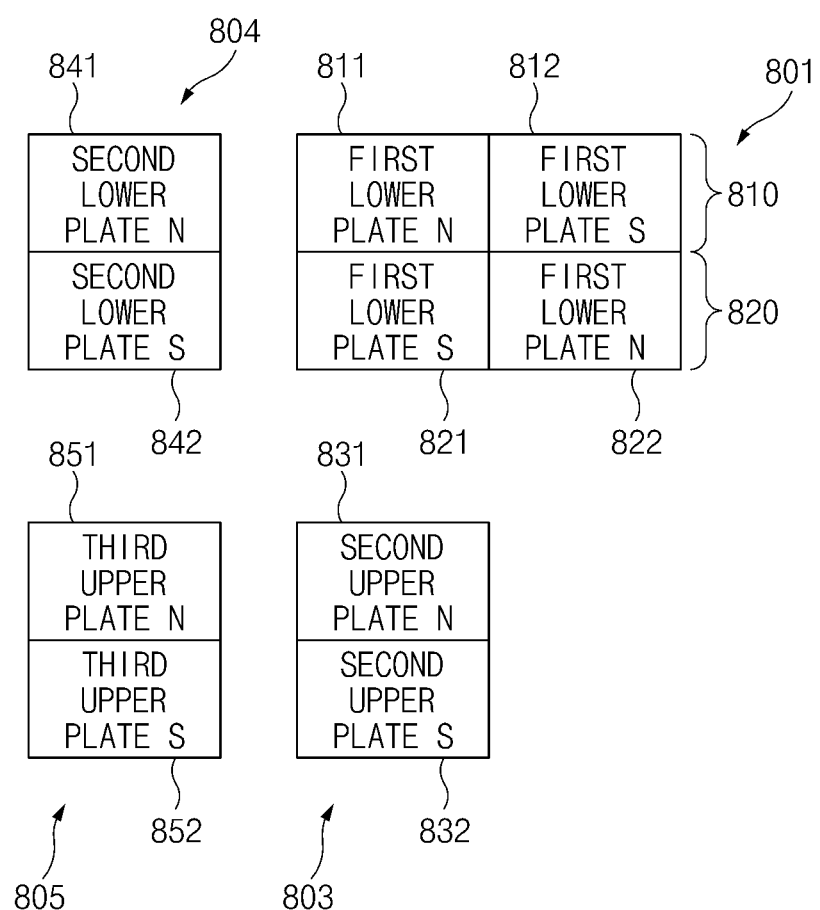
FIG. 8D illustrates a support connector, a stopper, and a magnetic body of an upper cover in the fourth folding state according to an embodiment of the present disclosure.

FIG. 8D illustrates a support connector, a stopper, and a magnetic body of an upper cover in the fourth folding state according to an embodiment of the present disclosure.

Referring to FIG. 8D, a magnetic body form 801 corresponding to the stopper 240 includes a first stopper layer 810 in which an 11-th stopper magnetic body 811 (e.g., a first lower plate N) having the first polarity and a 12-th stopper magnetic body 812 (e.g., a first lower plate S) having the second polarity, and a second stopper layer 820 in which a 21-st stopper magnetic body 821 (e.g., a first lower plate S) having the second polarity and a 22-nd stopper magnetic body 822 (e.g., a first lower plate N) disposed under the first stopper layer 810. The 11-th stopper magnetic body 811 overlaps the 21-st stopper magnetic body 821, and the 12-th stopper magnetic body 812 overlaps the 22-nd stopper magnetic body 822. A magnetic body 803 corresponding to the second upper magnetic body 112 includes an 81-st upper magnetic body 831 (e.g., a second upper plate N) having the first polarity and an 82-nd upper magnetic body 832 (e.g., a second upper plate S) having the second polarity disposed under the 81-st upper magnetic body 831. In the fourth folding state, the 81-st upper magnetic body 831 having the first polarity contacts the 21-st stopper magnetic body 821 based on magnetic force.

A magnetic body form 804 corresponding to the support connector 230 includes a first support magnetic body 841 (e.g., a second lower plate N) having the first polarity and a second support magnetic body 842 (e.g., a second lower plate S) having the second polarity is disposed under the first support magnetic body 841.

A magnetic body form 805 corresponding to the third upper magnetic body 113 of the upper cover 100 includes an 83-rd upper magnetic body 851 (e.g., a third upper plate N) having the first polarity, and an 84-th upper magnetic body 852 (e.g., a third upper plate S) having the second polarity disposed under the 83-rd upper magnetic body 851.

In the fourth folding state, the second support magnetic body 842 having the second polarity contacts the 83-rd upper magnetic body 851 having the first polarity based on magnetic force.

Figure 9A:
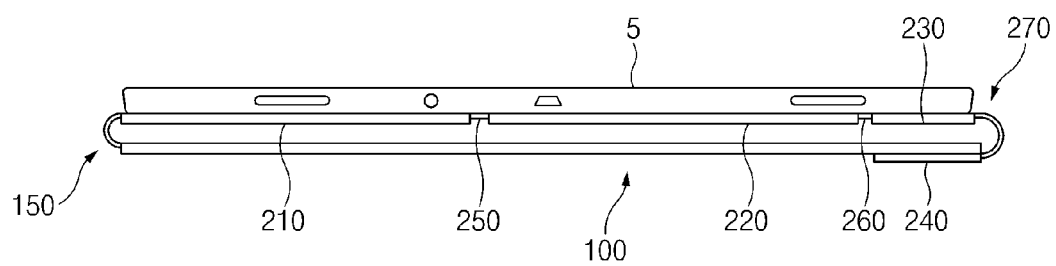
FIG. 9A illustrates a fifth folding state of a cover connected to an electronic device according to an embodiment of the present disclosure.

FIG. 9A illustrates a fifth folding state of a cover connected to an electronic device according to an embodiment of the present disclosure.

Referring to FIG. 9A, the upper cover 100 is folded away from the electronic device 5 to be substantially parallel to the lower cover 200. For example, The cover connector 150 disposed between the upper cover 100 and the lower cover 200 may be disposed to be exposed to a side (for example, the left side) of the electronic device 5 as the upper cover 100 is pivoted.

The lower cover 200 contacts the rear surface of the electronic device 5. Specifically, the device connector 210, the support 220, and the support connector 230 of the lower cover 200 contact the rear surface of the electronic device 5. The stopper connector 270 of the lower cover 200 may be disposed to be exposed to a side (for example, the right side) of the electronic device 5. The stopper 240 pivots using the stopper connector 270 to be disposed under a periphery of the upper cover 100. An area (for example, the left side) of the rear surface of the electronic device 5 according to an embodiment of the present disclosure may be seated on the device connector 210 while being coupled to the coupling boss disposed in the device connector 210. Another area (for example, the right side) of the rear surface of the electronic device 5 may be disposed on the support 220 and the support connector 230. The electronic device 5 in a fifth folding state (e.g., a mounting type position), wherein the display surface of the electronic device 5 is substantially parallel to the upper cover 100.

Figure 9B:
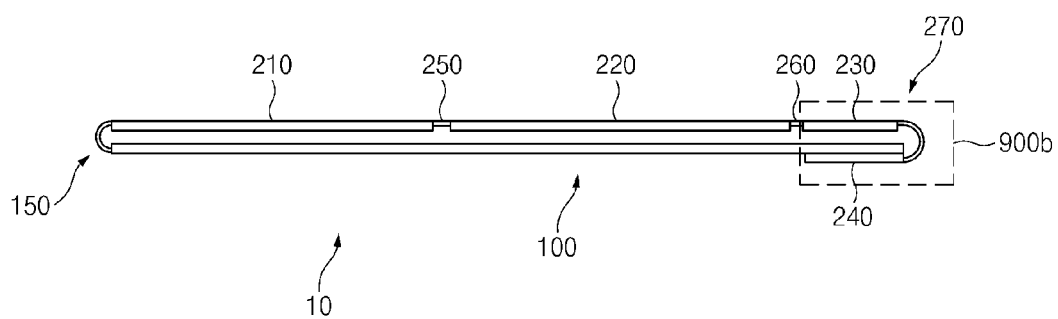
FIG. 9B illustrates a cover module in the fifth folding state according to an embodiment of the present disclosure.

FIG. 9B illustrates a cover module in the fifth folding state according to an embodiment of the present disclosure. Specifically, FIG. 9B illustrates the same cover illustrated in FIG. 9A, except that the electronic device 5 is not connected thereto. Referring to FIG. 9B, the cover module 10 may be disposed such that the inner surface of the upper cover 100 faces the lower side (or the bottom surface), and may be disposed such that the outer surface of the upper cover 100 faces the upper side (for example, a side on which the electronic device 5 is disposed or the lower cover 200). Accordingly, the upper magnetic substrate disposed in the upper cover 100 and a peripheral area in which the first upper magnetic body is disposed may be disposed in a right peripheral area of the upper cover 100. The cover connector 150 which connects the upper cover 100 and the lower cover 200 may be disposed on the left side, and the stopper connector 270 may be disposed on the right side.

In the lower cover 200 according to an embodiment of the present disclosure, the device connector 210 may be disposed on the left side of the lower cover 200 and the support 220 may be disposed at a central portion of the lower cover 200. The support connector 230 connected to the support 220 may be disposed at a right periphery of the lower cover 200 while being disposed on the right side of the support 220. While the upper cover 100 is disposed under the lower cover 200, the device connector 210, the support 220, and the support connector 230 may be disposed to face the outer surface of the upper cover 100. The stopper 240 may be disposed to overlap one side of the upper cover 100 while maintaining a connection through the stopper connector 270. According to an embodiment of the present disclosure, the outer surface of the stopper 240 may make contact with the inner surface of a periphery of the upper cover 100.

Figure 9C:
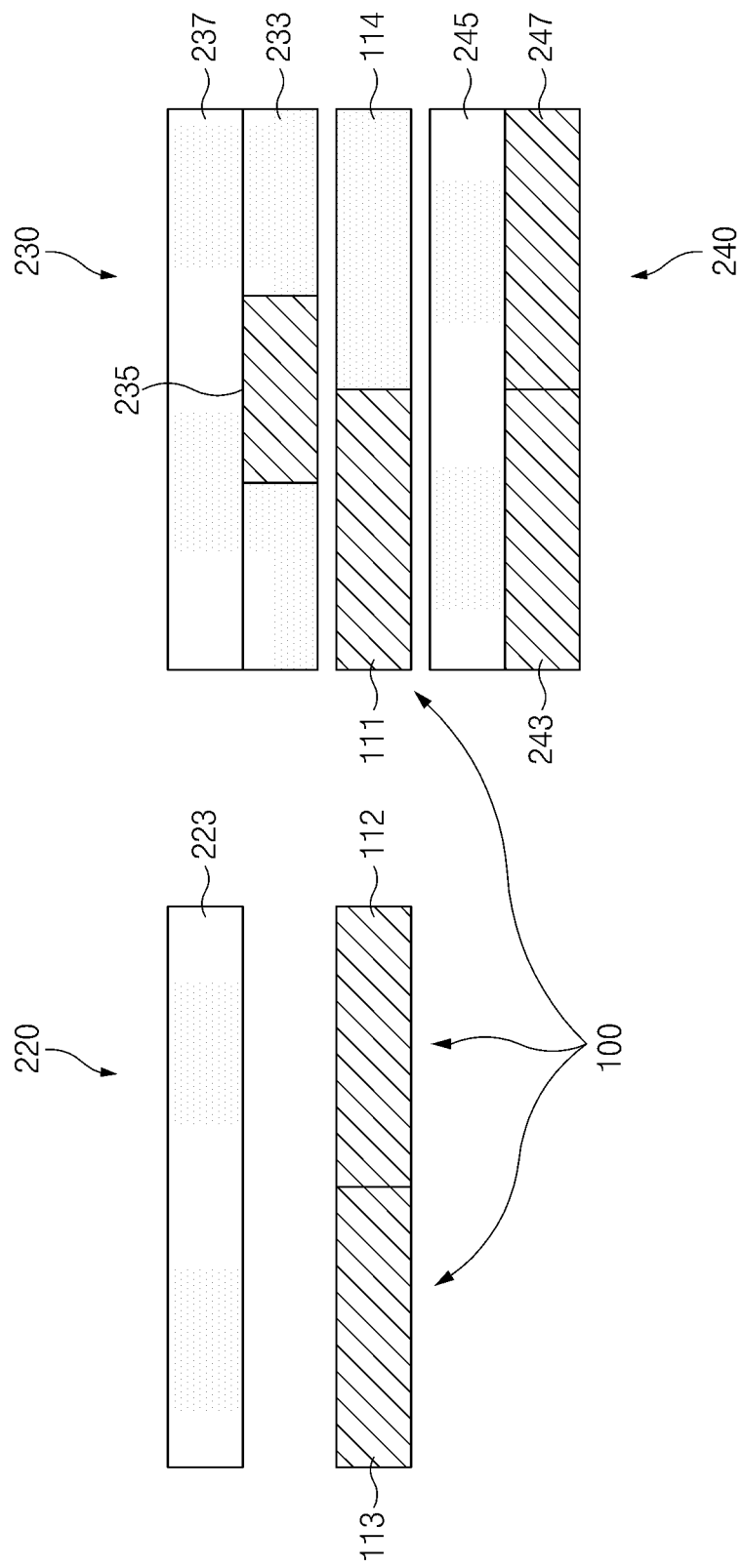
FIG. 9C illustrates a magnetic body in area 900b of FIG. 9B in the fifth folding state according to an embodiment of the present disclosure.

FIG. 9C illustrates a magnetic body in area 900b of FIG. 9B in the fifth folding state according to an embodiment of the present disclosure.

Referring to FIG. 9C, an upper portion of a periphery of the upper cover 100 (for example, a right periphery of the outer surface of the upper cover 100) may face the outer surface of the support connector 230 of the lower cover 200 in an area of the cover module 10. Further, a right periphery of the upper cover 100 (e.g., a right periphery of the inner surface of the upper cover 100) and the stopper 240 overlap each other. In this state, a periphery of the upper cover 100 may be an area in which the upper magnetic substrate 114 and the first upper magnetic body 111 are disposed. As mentioned above, it is understood that a periphery of the upper cover 100 is configured such that the first upper magnetic body 111 is disposed on the left side as illustrated because the first upper magnetic body 111 is disposed to be inclined to the left side of the upper magnetic substrate 114. The upper magnetic substrate 114 may include at least one hole in which the first upper magnetic body 111 is disposed, and may also include an area other than the hole. The upper magnetic substrate 114 may include, for example, a magnetic field shielding sheet or a substrate (for example, a metallic steel plate, a magnetized alloy, or a magnetized synthetic nonmetallic material) that shields a magnetic field.

The support connector 230 is positioned over the upper cover 100 and the stopper 240 is positioned under the upper cover 100.

As described above, the support connector 230 includes the second support connecting substrate 237, the third support connecting substrate 233 disposed under the second support connecting substrate 237, and the support connecting magnetic body 235 inserted into a hole disposed at the center of the third support connecting substrate 233. Additionally, the support connector 230 may further include a substrate (for example, a first support connecting substrate 231) on which the substrates are disposed.

In the fifth folding state, the third support connecting substrate 233 and the support connecting magnetic body 235 face the first upper magnetic body 111 and the upper magnetic substrate 114 disposed at a right periphery of the upper cover 100 to contact the first upper magnetic body 111 and the upper magnetic substrate 114 based on magnetic force. Because the support connecting magnetic body 235 and a part of the first upper magnetic body 111 face each other, magnetic force based contact may be provided such that opposite polarities are disposed.

As described above, the stopper 240 includes the second stopper substrate 247, the third stopper substrate 245, and the stopper magnetic body 243.

In the fifth folding state, the third stopper substrate 245 contacts the upper cover 100. The second stopper substrate 247 may be provided with a hole, for example, such that the magnetic body 243 (for example, a coil type permanent magnet) is partially disposed on a substrate (for example, a steel plate) having a magnetic property. The third stopper substrate 245 may be disposed on the upper surface of the second stopper substrate 247. The third stopper substrate 245 may be disposed such that the stopper magnetic body 243 hides an exposed surface. Specifically, the third stopper substrate 245 faces the first upper magnetic body 111 disposed at a right periphery of the upper cover 100 to make contact with the first upper magnetic body 111 based on a magnetic force.

The support 220 includes the support magnetic body substrate 223, which faces the second upper magnetic body 112 and the third upper magnetic body 113. The support magnetic body substrate 223 may contact with the second upper magnetic body 112 and the third upper magnetic body 113 based on magnetic force.

In the fifth folding state, the cover 10 may not provide the electronic device 5 with an influence of a magnetic field separately because the second support connecting substrate 237 of the support connector 230 is disposed on a side closer to the electronic device 5.

Figure 9D:
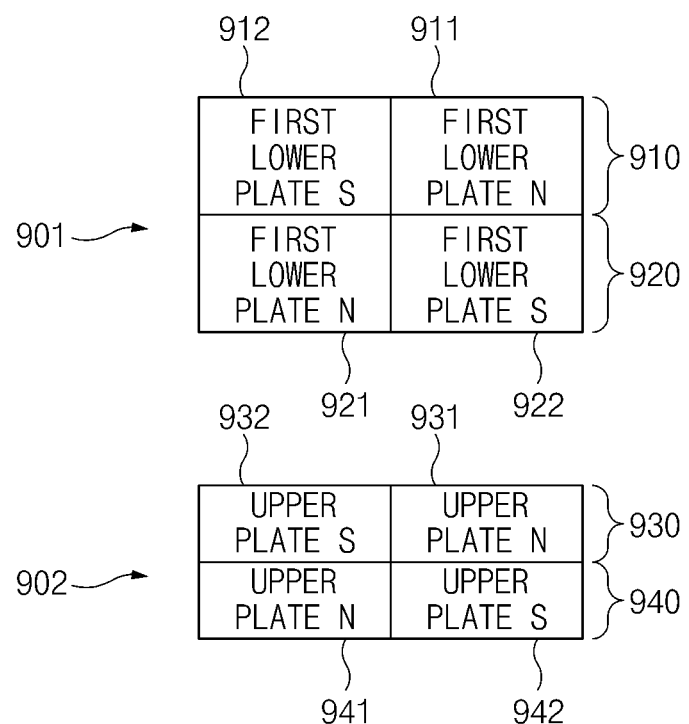
FIG. 9D illustrates a magnetic body in the fifth folding state according to an embodiment of the present disclosure.

FIG. 9D illustrates a magnetic body in the fifth folding state according to an embodiment of the present disclosure.

Referring to FIG. 9D, a magnetic body form 901 corresponding to the support connector 230 and the upper cover 100 includes a 91-st magnetic body 911 (e.g., a first lower plate N) having the first polarity and a 92-nd magnetic body 912 (e.g., a first lower plate S) having the second polarity, and a 93-rd magnetic body 922 (e.g., a first lower plate S) having the second polarity and a 94-th magnetic body 921 (e.g., a first lower plate N) having the first polarity disposed under the 91-st magnetic body 911 and the 92-nd magnetic body 912. Accordingly, the 91-st magnetic body 911 and the 94-th magnetic body 921 are disposed on the upper and lower sides, respectively, and the 92-nd magnetic body 912 and the 93-rd magnetic body 922 are disposed on the upper and lower sides, respectively.

A magnetic body 902 corresponding to the stopper 240 includes a 95-th magnetic body 931 (e.g., an upper plate N) having the first polarity and a 96-th magnetic body 942 (e.g., an upper plate S) having the second polarity, and a 97-th magnetic body 932 (e.g., an upper plate S) having the second polarity and a 98-th magnetic body 941 (e.g., an upper plate N) having the first polarity.

Figure 10A:
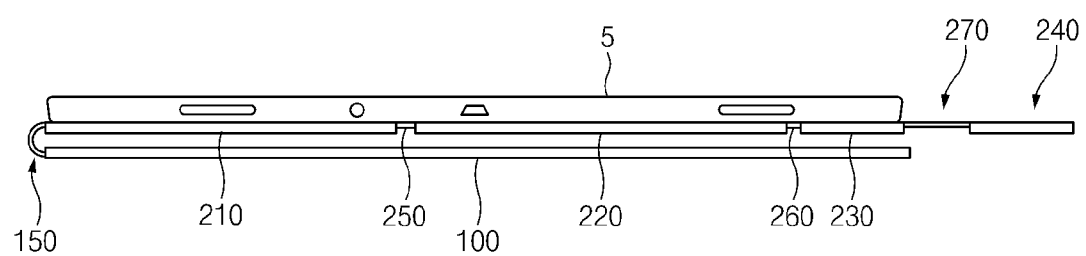
FIG. 10A illustrates a sixth folding state of a cover connected to an electronic device according to an embodiment of the present disclosure.

FIG. 10A illustrates a sixth folding state of a cover connected to an electronic device according to an embodiment of the present disclosure.

Referring to FIG. 10A, similar to FIG. 9A, the upper cover 100 is folded away from the electronic device 5 to be substantially parallel to the lower cover 200. However, different than FIG. 9A, the stopper 240 is not folded under the upper cover 100. The cover connector 150 disposed between the upper cover 100 and the lower cover 200 may be disposed to be exposed to a side (for example, the left side) of the electronic device 5 as the upper cover 100 is pivoted.

At least a portion of the lower cover 200 according to an embodiment of the present disclosure may be disposed to cover the rear surface of the electronic device 5. For example, the device connector 210, the support 220, and the support connector 230 of the lower cover 200 may be disposed to cover the rear surface of the electronic device 5. The stopper connector 270 of the lower cover 200 may be disposed to be exposed to a side (for example, the right side) of the electronic device 5 Instead, the stopper 240 is disposed in parallel to the support connector 230.

An area (for example, the left side) of the rear surface of the electronic device 5 according to an embodiment of the present disclosure may be seated on the device connector 210 while being coupled to the coupling boss disposed in the device connector 210. Another area (for example, the right side) of the rear surface of the electronic device 5 may be disposed on the support 220 and the support connector 230. The electronic device 5 may have a sixth folding state (for example, a mounting type) in which one surface of the upper cover 100 is disposed on the front display to face the front display.

Figure 10B:
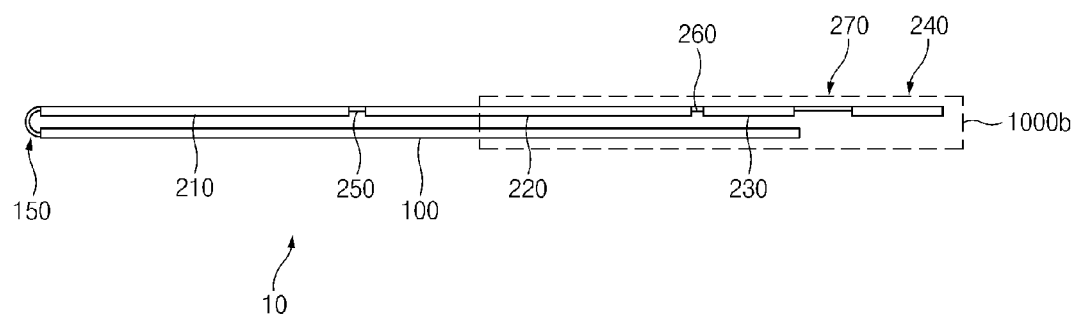
FIG. 10B illustrates a cover in the sixth folding state according to an embodiment of the present disclosure.

FIG. 10B illustrates a cover in the sixth folding state according to an embodiment of the present disclosure. Specifically, FIG. 10B illustrates the same cover illustrated in FIG. 10A, except that the electronic device 5 is not connected thereto.

Referring to FIG. 10B, the cover module 10 may be disposed such that the inner surface of the upper cover 100 faces the lower side (or the bottom surface), and may be disposed such that the outer surface of the upper cover 100 faces the upper side (for example, a side on which the electronic device 5 is disposed or the lower cover 200). The cover connector 150 which connects the upper cover 100 and the lower cover 200 may be disposed at a left side of the cover module 10. The stopper connector 270 may be disposed on a surface on which the lower cover 200 is positioned, in parallel to the lower cover 200.

Figure 10C:
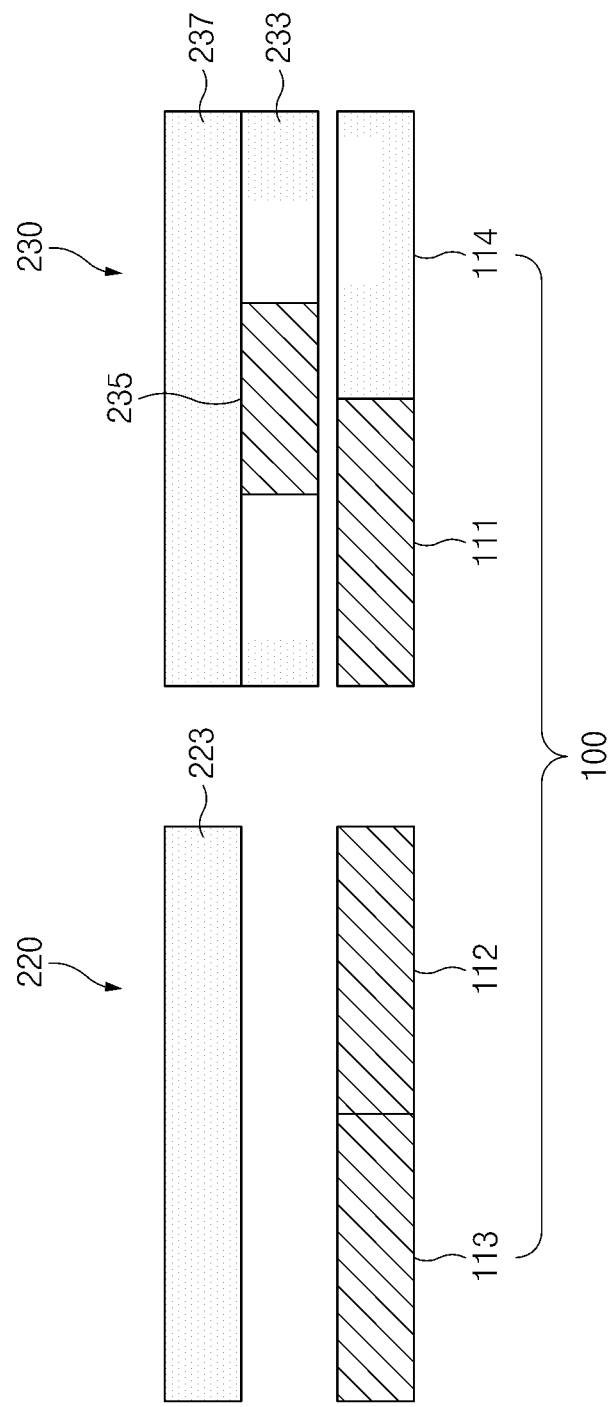
FIG. 10C illustrates a magnetic body in area 1000b of FIG. 10B in the sixth folding state according to an embodiment of the present disclosure.

FIG. 10C illustrates a magnetic body in area 1000b of FIG. 10B in the sixth folding state according to an embodiment of the present disclosure.

Referring to FIG. 10C, the support connector 230 of the lower cover 200 faces a periphery of the upper cover. The support connector 230 includes the second support connecting substrate 237, the third support connecting substrate 233, and the support connecting magnetic body 235.

In the sixth folding state, the third support connecting substrate 233 and the support connecting magnetic body 235 may face a part of the first upper magnetic body 111 and a part of the upper magnetic substrate 114 to make contact with the first upper magnetic body 111 and the upper magnetic substrate 114 based on magnetic force.

The support 220 according to an embodiment of the present disclosure may include, for example, a support magnetic body substrate 223. The support magnetic body substrate 223 may be formed, for example, of a metal plate or a magnetic field shielding sheet. The support magnetic body substrate 223 may face the second upper magnetic body 112 and the third upper magnetic body 113. The support magnetic body substrate 223 may make contact with the second upper magnetic body 112 and the third upper magnetic body 113 based on a magnetic force.

According to various embodiments of the present disclosure, there is provided an accessory device (for example, the cover module) capable of being detachably connected to an electronic device having a first surface including a display and a second surface facing an opposite side of the first surface, the accessory device including a first member (for example, the upper cover) covering at least a portion of the first surface of the electronic device and including a first plate having a first size and a first shape, a second member (for example, the device connector) flexibly connected to the first member and including a second plate having a second size smaller than the first size and a second shape, a third member (for example, the support) flexibly connected to the second member on an opposite side of the first member and including a third plate having a third size smaller than the first size and a third shape, a fourth member (for example, the support connector) flexibly connected to the third member on an opposite side of the second member and including a fourth plate having a fourth size smaller than the first size and a fourth shape, and a fifth member (for example, the stopper) flexibly connected to the fourth member on an opposite side of the third member and including a fifth plate having a fifth size smaller than the first size and a fifth shape, wherein at least one of the first member, the fourth member, or the fifth member includes one or more magnetic body or a material attracted by a magnet, and wherein at least a portion of at least one of the second member or the third member includes a material which at least partially interrupts a magnetic field generated by the magnetic bodies.

According to various embodiments of the present disclosure, the magnetic body or the material may include at least one of a ferromagnetic substance, an antiferromagnetic substance, or a ferrimagnetic substance.

According to various embodiments of the present disclosure, the cover module may further include a fixing structure (for example, a coupling boss of the device connector) for fixing the electronic device to the accessory device.

According to various embodiments of the present disclosure, the fixing structure may be disposed in the second member.

According to various embodiments of the present disclosure, the accessory device may further include at least one of a first connecting structure (for example, a cover connector) which connects the first member and the second member, a second connecting structure (for example, a first joint) which connects the second member and the third member, a third connecting structure (for example, a second connector) which connects the third member and the fourth member, or a fourth connecting structure (for example, a stopper connector) which connects the fourth member and the fifth member.

According to various embodiments of the present disclosure, the size of the first member may be larger than at least one of the second member or the third member, and the fourth member and the fifth member may be smaller than the second member and the third member.

According to various embodiments of the present disclosure, the fourth connecting structure may be large than the first connecting structure, and the first connecting structure may be larger than the second structure and the third connecting structure.

According to various embodiments of the present disclosure, the second member and the third member may be substantially the same, and the fourth member and the fifth member may be substantially the same.

According to various embodiments of the present disclosure, the size of the first member may be substantially the same as a total sum of the sizes of the second member, the third member, and the fourth member, and the sizes of the second connecting structure and the third connecting structure.

Figure 11:
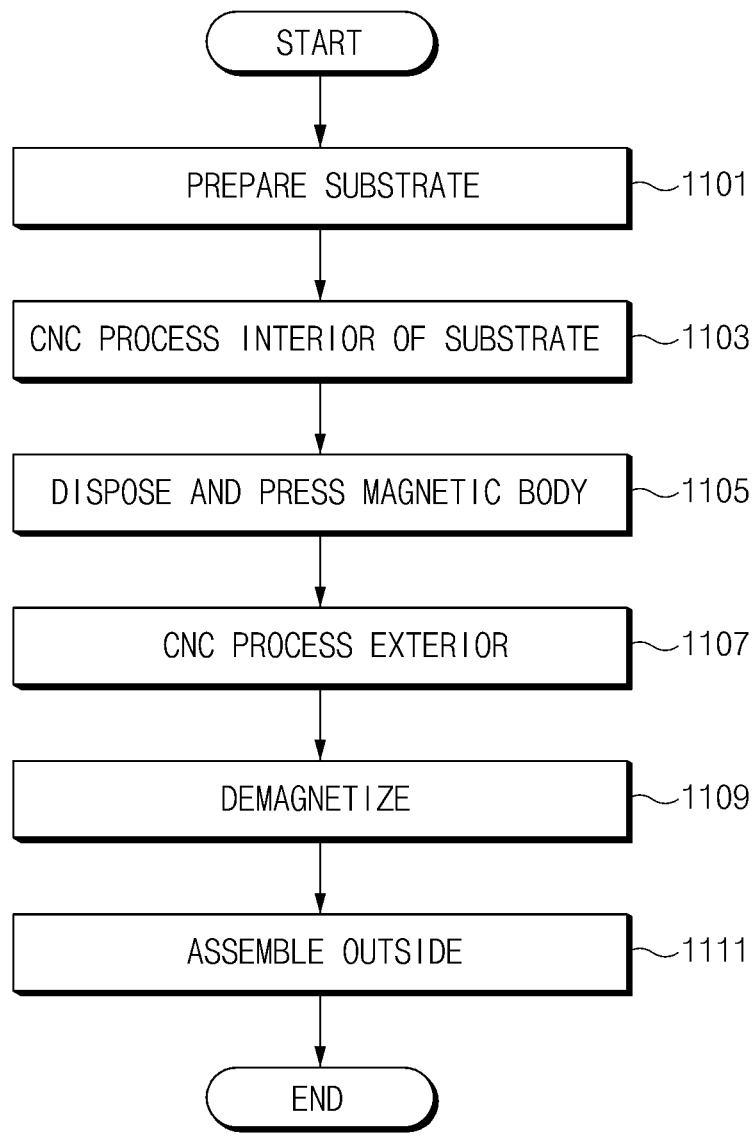
FIG. 11 is a flowchart illustrating a method for manufacturing a cover according to an embodiment of the present disclosure.

FIG. 11 is a flowchart illustrating a method for manufacturing a cover according to an embodiment of the present disclosure.

Referring to FIG. 11, a substrate is prepared in step 1101. For example, the substrate may be formed of a permanent magnetic body, a material that may be attracted by a magnetic force of a magnet, or a material that reduces or eliminates an influence of a magnetic field by the magnetic force.

In step 1103, computer numeric control (CNC) processing is performed on the interior of the substrate. The CNC processing of the interior of the substrate may process a shielding part through a CNC machine or other processing tools such that a material having a magnetic force is inserted into and mounted on the shielding part.

In step 1105, a magnetic body is disposed a pressed on the substrate. For example, the material having a magnetic force (e.g., a magnetic body) may be inserted, and an epoxy material having a thickness of 0.1 mm to 0.15 mm is attached to the upper and lower surfaces of the inserted magnetic material and is thermally pressed, so that the magnetic material is fixed.

In step 1107, CNC processing is performed on the exterior of the substrate. For example, an external appearance may be processed to be mounted to an accessory cover through the exterior CNC processing.

In step 1109, demagnetization is performed. The product, of which the exterior processing process has been finished, undergoes a demagnetization process for producing a magnetic force in the magnetic material in operation 1109, thereby generating a magnetic force in the magnetic material.

In step 1111, assembling of an outside is performed. For example, an assembly process may be performed on the accessory cover.

A cover that is mounted to or integrated with an electronic device according to an embodiment of the present disclosure may have a housing, an input detecting panel having an input manner that is influenced by a magnetic field, e.g., a panel having an input manner such as an electromagnetic induction manner or a magnetic induction manner, a display on which the input detecting panel is mounted, and a rear surface on which the cover module is mounted.

The electronic device may include an electric pen related to an operation of the input detecting panel. The electronic device may include a shielding part on which a material, which reduces an influence of a magnetic field on the electronic device, is mounted as an element of the cover of the electronic device which may be used with a pen. Accordingly, when an input operation of the electronic device is performed by a device (for example, an S-pen) having an input unit other than a touch in the state in which the cover module having a magnetic body is mounted, the electronic device can prevent display screen distortion based on the shielding part.

The shielding part may be disposed, for example, on at least one of the inside and outside of the rear case of the electronic device. The shielding unit may be disposed, for example, while one or more metal lines which reduces an influence of a magnetic field form a designated pattern. Further, the shielding part may have a film shape of a thin film of a material which shields a magnetic field. The metal lines may be formed, for example, of steel, copper, aluminum, stainless steel, a titanium, or magnesium alloy.

A coupling recess, which receives a coupling boss disposed in the cover, may be provided on the rear surface of the electronic device. A resilient member which is moved upwards and downwards (e.g., towards the inside or outside of the electronic device) may be disposed in the coupling recess according to an external pressure. When the cover module is not coupled, the resilient member may close the opening of the coupling recess. Accordingly, the coupling recess, into which the resilient member is inserted, may be viewed as the same surface (a surface parallel to the rear surface) of the rear surface of the electronic device. The coupling boss of the cover module may be inserted and fixed while pushing the resilient member towards the inside of the electronic device according to an external pressure applied from the outside while the coupling recess and the cover module are coupled to each other.

The electronic device may include at least one processor (for example, an application processor (AP)), a communication module, a memory, a sensor module, an input unit, a display, an interface, and an audio module.

The processor may control a plurality of hardware or software components by driving an operating system or an application program and perform a variety of data processing and calculations. The processor may be implemented by, for example, a System on Chip (SoC). According to an embodiment of the present disclosure, the processor may further include a Graphical Processing Unit (GPU) and/or an image signal processor.

A sensor module may measure, for example, a physical quantity or detect an operational state of the electronic device, and may convert the measured or sensed information into an electric signal. The sensor module may include, for example, at least one of a gesture sensor, a gyro sensor, a pressure sensor, a magnetic sensor, an acceleration sensor, a grip sensor, a proximity sensor, a color sensor (for example, an RGB (red, green, and blue) sensor, a bio sensor, a temperature/humidity sensor, an illumination intensity sensor, or a ultra violet (UV) sensor. Additionally or alternatively, the sensor module 540 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor.

The sensor module may include a Hall sensor (e.g., a Hall IC). The Hall sensor may detect a magnet for a Hall sensor disposed in the cover module. The electronic device may recognize a folding state of the cover module as the magnet for a Hall sensor approaches. For example, the electronic device may recognize a covering state or an opening state of the upper cover by detecting a magnetic force of the magnet for a Hall sensor (e.g., by operating the Hall sensor).

The sensor module may further include a control circuit for controlling one or more sensors included therein. The electronic device may further include a processor configured to control a sensor module as a part of or separately from the processor, and may control the sensor module while the processor is in a sleep mode.

The input unit may include, for example, a touch panel, a (digital) pen sensor, a key, and an ultrasonic input unit. The touch panel may use at least one of, for example, a capacitive type, a resistive type, an infrared type, and an ultrasonic type. The touch panel may further include a control circuit. The touch panel may further include a tactile layer, and provide a tactile reaction to a user.

The (digital) pen sensor may include, for example, a recognition sheet which is a part of the touch panel or a separate recognition sheet. The pen sensor according to an embodiment of the present disclosure may include an input detecting panel (for example, an electromagnetic induction type panel).

The display panel may be implemented to be flexible, transparent, or wearable. The panel may be configured as one module with the touch panel. The display may further include a control circuit for controlling a panel.

According to an embodiment of the present disclosure, an electronic device is provided, which includes a housing, a display disposed on a first surface of the housing, an input detecting panel disposed between the first surface of the housing and a second surface facing an opposite side of the first surface to detect a user input on the display, a first member covering at least a portion of the first surface of the housing and including a first plate having a first size and a first shape, a second member flexibly connected to the first member and including a second plate having a second size smaller than the first size and a second shape, a third member flexibly connected to the second member on an opposite side of the first member and including a third plate having a third size smaller than the first size and a third shape, a fourth member flexibly connected to the third member on an opposite side of the second member and including a fourth plate having a fourth size smaller than the first size and a fourth shape, and a fifth member flexibly connected to the fourth member on an opposite side of the third member and including a fifth plate having a fifth size smaller than the first size and a fifth shape, wherein at least one of the first member, the fourth member, or the fifth member includes one or more magnetic bodies or materials attracted by a magnet.

At least a portion of at least one of the second member or the third member includes a material which at least partially interrupts a malfunction of the input detecting panel due to a magnetic field generated by the magnetic bodies.

The input detecting panel may be an electromagnetic induction panel.

Each of the elements described in the specification may include one or more components, and the terms of the elements may be changed according to the type of the electronic device. In various embodiments of the present disclosure, the electronic device may include at least one of the elements described in the specification, and some elements may be omitted or additional elements may be further included. Some of the elements of the electronic device according to various embodiments of the present disclosure may be coupled to form one entity, and may perform the same functions of the corresponding elements before they are coupled.

The term "module" used in the specification may mean a unit including, for example, one of hardware, software, or firmware or a combination of the two or more of them. The module may be interchangeably used, for example, with a unit, a logic, a logical block, a component, or a circuit. The module may be a minimum unit or a part of an integrally configured part. The module may be a minimum unit or a part which performs one or more functions. The module may be implemented mechanically or electromagnetically. For example, the module may include at least one of an application-specific integrated circuit (ASIC) chip, a field-programmable gate array, or a programmable-logic device, which has been known, will be developed in the future, or performs certain operations.

At least some of the devices (for example, modules or functions) or methods (for example, operations) according to various embodiments of the present disclosure may be implemented by an instruction stored in a computer-readable storage medium, for example, in the form of a program module. When the instruction is executed by the processor, the at least one processor may perform a function corresponding to the instruction. The computer-readable storage medium may be, for example, a memory.

The computer-readable storage medium may include a hard disk, a floppy disk, a magnetic medium (for example, a magnetic tape), an optical medium (for example, a compact disk read only memory (CD-ROM)), a digital versatile disk (DVD), a magneto-optical medium (for example, a floptical disk), a hardware device (for example, a read only memory (ROM), a random access memory (RAM), or a flash memory). Further, the program instructions may include high-level language codes which may be executed by a computer using an interpreter as well as machine languages created by using a compiler. The above-mentioned hardware device may be configured to be operated as one or more software module to perform operations of various embodiments, and the converse is applied.

The module or program module according to various embodiments of the present disclosure may include at least one of the above-mentioned elements, omit some of them, or further include other elements. The module, the program module, or the operations performed by other elements according to various embodiments of the present disclosure may be performed in a sequential, parallel, iterative, or heuristic method. Further, some operations may be executed in another sequence or may be omitted, or other operations may be added. Further, the embodiments disclosed in the specification are provided to describe the technical contents or for understanding of the technical contents, and the technical scope of the present disclosure is not limited thereto. Accordingly, the scope of the present disclosure should be construed to include all changes or various embodiments based on the technical spirit of the present disclosure.

The computer-readable storage medium may include a hard disk, a floppy disk, a magnetic medium (for example, a magnetic tape), an optical medium (for example, a compact disk read only memory (CD-ROM)), a digital versatile disk (DVD), a magneto-optical medium (for example, a floptical disk), a hardware device (for example, a read only memory (ROM), a random access memory (RAM), or a flash memory). Further, the program instructions may include high-level language codes which may be executed by a computer using an interpreter as well as machine languages created by using a compiler. The above-mentioned hardware device may be configured to be operated as one or more software module to perform operations of various embodiments, and the converse is true.

The module or program module according to various embodiments of the present disclosure may include at least one of the above-mentioned elements, omit some of them, or further include other elements. The module, the program module, or the operations performed by other elements according to various embodiments of the present disclosure may be performed in a sequential, parallel, iterative, or heuristic method. Further, some operations may be executed in another sequence or may be omitted, or other operations may be added.

Various embodiments of the present disclosure can help firmly maintain a folding state of an accessory device while allowing the accessory device to be folded more easily, by disposing a magnetic body or a magnet in the accessory device.

Further, various embodiments of the present disclosure can help interrupt an influence of a magnetic field by a permanent magnetic body on an electronic device while providing various folding states, by disposing at least one of a temporary magnetic body or a permanent magnetic body at a designated location.

According to an embodiment of the present disclosure, a distortion phenomenon of an electromagnetic induction panel or a display screen which is influenced by a magnetic field can be prevented by disposing a shield member which interrupts a magnetic field shown by a magnetic body at a lower portion of an electronic device.

In addition, various effects induced through the specification can be provided.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An accessory device that covers at least a portion of an electronic device, the accessory device comprising:
   a first member that is foldable to cover at least a portion of a front surface of the electronic device or to towards a rear surface of the electronic device;
   a second member that is flexibly connected to the first member and detachably connected to the rear surface of the electronic device;
   a third member that is flexibly connected to the second member and capable of being disposed to cover the rear surface of the electronic device or supporting the rear surface of the electronic device corresponding to a folding state thereof;
   a fourth member that is flexibly connected to the third member and foldable to cover the rear surface of the electronic device or to support the third member; and
   a fifth member that is flexibly connected to the fourth member and foldable to contact the first member at a first position or to contact the first member at a second position and support the fourth member by maintaining contact with the first member at the second position,
   wherein the fifth member maintains contact with the first member using magnetic force, and
   wherein at least one of the second member and the third member comprises a material that interrupts a magnetic field generated by the magnetic body or the magnet.

2. The accessory device of claim 1, wherein at least one of the first member, the fourth member, and the fifth member comprises a magnetic body or material attracted by a magnet.

3. The accessory device of claim 1, wherein the magnetic body or the material comprises at least one of a ferromagnetic material, an antiferromagnetic material, and a ferrimagnetic material.

4. The accessory device of claim 1, further comprising a fixing structure for detachably connecting the accessory to the electronic device.

5. The accessory device of claim 4, wherein the fixing structure is disposed in the second member.

6. The accessory device of claim 1, further comprising a guide wall included in the second member to guide a disposition location of the electronic device.

7. The accessory device of claim 1, further comprising at least one of:
   a first connecting structure that connects the first member and the second member;
   a second connecting structure that connects the second member and the third member;
   a third connecting structure that connects the third member and the fourth member; or
   a fourth connecting structure that connects the fourth member and the fifth member.

8. The accessory device of claim 7, wherein the fourth connecting structure is larger than the first connecting structure.

9. The accessory device of claim 7, wherein the first connecting structure is larger than the second connecting structure and the third connecting structure.

10. The accessory device of claim 7, wherein a surface area of the first member is substantially equal to combined surfaces areas of the second member, the third member, the fourth member, the second connecting structure, and the third connecting structure.

11. The accessory device of claim 1, wherein the second member and the third member are substantially the same size, and the fourth member and the fifth member are substantially the same size.

12. The accessory device of claim 1, wherein the first member is larger than at least one of the second member and the third member.

13. The accessory device of claim 1, wherein at least one of the fourth member and the fifth member is smaller than at least one of the second member and the third member.

14. The accessory device of claim 1, wherein the first member comprises a Hall IC magnet for recognizing a folding state of the first member in the electronic device.

15. The accessory device of claim 1, further comprising a groove formed on an outer surface of the first member to guide a contact location of the fourth member or the fifth member.

16. An accessory device that is detachably connected to an electronic device including a display surface and a rear surface facing an opposite side of the display surface, the accessory device comprising:
   a first member that is foldable to cover at least a portion of the display surface of the electronic device, the first member including a first plate;
   a second member that is flexibly connected to the first member, the second member including a second plate that is smaller than the first plate;
   a third member that is flexibly connected to the second member on an opposite side of the first member, the third member including a third plate that is smaller than the first plate;

a fourth member that is flexibly connected to the third member on an opposite side of the second member, the fourth member including a fourth plate that is smaller than the first plate; and a fifth member that is flexibly connected to the fourth member on an opposite side of the third member, the fifth member including a fifth plate that is smaller than the first plate, wherein at least one of the first member, the fourth member, and the fifth member comprises a magnetic body or a material attracted by a magnet, and wherein at least one of the second member and the third member comprises a material that interrupts a magnetic field generated by the magnetic body.

17. An electronic device comprising:

a housing;

a touch screen display disposed at a first surface of the housing;

a first member that is foldable to cover at least a portion of the first surface of the housing, the first member including a first plate;

a second member that is flexibly connected to the first member and fixed to a second surface of the housing, the second surface of the housing being opposite the first surface of the housing and the second member including a second plate that is smaller than the first plate;

a third member that is flexibly connected to the second member on an opposite side of the first member, the third member including a third plate that is smaller than the first plate;

a fourth member that is flexibly connected to the third member on an opposite side of the second member, the fourth member including a fourth plate that is smaller than the first plate; and a fifth member that is flexibly connected to the fourth member on an opposite side of the third member, the fifth member including a fifth plate that is smaller than the first plate, wherein at least one of the first member, the fourth member, and the fifth member includes a magnetic body or a material that is attracted by a magnet.

18. The electronic device of claim 17, wherein at least one of the second member and the third member comprises a material that interrupts a malfunction of the touch screen display due to a magnetic field generated by the magnetic body.

19. The electronic device of claim 17, wherein touch screen display includes an electromagnetic induction panel.

* * * * *